United States Patent
Tsurumaru

(10) Patent No.: US 6,748,036 B1
(45) Date of Patent: Jun. 8, 2004

(54) RADIO RECEIVING METHOD AND APPARATUS

(75) Inventor: Makoto Tsurumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/215,334

(22) Filed: Dec. 18, 1998

(30) Foreign Application Priority Data

Dec. 18, 1997 (JP) ............................................... 9-349318

(51) Int. Cl.⁷ ................................................. H04L 27/22
(52) U.S. Cl. ........................ 375/344; 355/347; 455/257; 455/192.2
(58) Field of Search .................. 375/279–284, 375/324, 326, 327, 329–333, 344, 355, 347; 329/304; 455/257, 192.2

(56) References Cited

U.S. PATENT DOCUMENTS

| | | |
|---|---|---|
| 4,937,841 A | 6/1990 | Chuang et al. |
| 5,343,502 A | 8/1994 | Sato |
| 5,440,259 A | 8/1995 | Yokomura |
| 5,570,370 A | 10/1996 | Lin |
| 5,638,409 A | 6/1997 | Awata et al. |
| 5,790,604 A * | 8/1998 | Kelton et al. ............... 375/344 |
| 5,809,009 A | 9/1998 | Matsuoka et al. |
| 5,862,187 A * | 1/1999 | Dwarakanath et al. ...... 329/304 |
| 5,946,359 A | 8/1999 | Tajiri et al. |

FOREIGN PATENT DOCUMENTS

| | | |
|---|---|---|
| EP | 62180634 A | 7/1987 |
| EP | 0 412 235 A2 | 1/1990 |
| JP | 6-197140 | 7/1994 |
| JP | 6-291788 | 10/1994 |
| JP | 7-264249 | 10/1995 |
| JP | 8-223240 | 8/1996 |
| JP | 09083590 | 3/1997 |
| JP | 09-162791 | 6/1997 |
| JP | 9-270827 | 10/1997 |
| JP | 10-041867 | 2/1998 |

OTHER PUBLICATIONS

Chuang et al. "Burst Coherent Detection with Robust Frequency and Timing Estimation for Portable Radio Communications"—"Communication for the Information Age"—Proceedings of the Global Telecommunications Conference and Exhibition. Vol. 2 pp 804–809—Bell Communications Research—Red Bank New Jersey 07701.

\* cited by examiner

*Primary Examiner*—Amanda T. Le
(74) *Attorney, Agent, or Firm*—Foley & Lardner

(57) ABSTRACT

The invention provides a radio receiving method and apparatus by which adjustment of a reception frequency when a radio modulation signal of a PSK system is received is realized by simple processing. Phase data is sampled out in a predetermined cycle from a random received modulation signal and cumulatively added for a predetermined period, and the reception frequency is adjusted so that a calculation result of the cumulative addition may satisfy a predetermined allowance range. Consequently, the reception frequency can be adjusted by simple processing without detecting a phase error from the modulation signal.

7 Claims, 18 Drawing Sheets freq_corr += g2*freq_err g2=MAX{0.9*g2,g2_min}

FIRST g2 = 21 (32 * 144/K)
K: TCXO INPUT COEFFICIENT (KHz/volt)
g21_mine: g2 INITIAL VALUE * 0.95

RADIO RECEIVING METHOD AND APPARATUS

BACKGROUND OF THE INVENTION

1. Field of the Invention

The present invention relates to a radio receiving method and apparatus for receiving a radio modulation signal of a PSK (Phase Shift Keying) system.

2. Description of the Related Art

Conventionally, a PSK system is known as one of modulation techniques used to communicate a digital signal by radio. In the PSK system, two values of a digital signal are represented with phase data of a modulation signal, and, for example, if the number of modulation phases is $2^M$, then a digital signal of M bits can be communicated by radio at a time.

As a radio communication apparatus in which such a PSK system as described above is used for communication by radio, for example, a digital cellular apparatus is available. A digital cellular apparatus corresponds to an apparatus wherein a radio transmission apparatus and a radio receiving apparatus of a PSK system are integrated with each other, and receives a radio modulation signal of a PSK system transmitted from a base station, demodulates the modulation signal into an audio signal and outputs the audio signal. Further, it modulates an audio signal inputted thereto into a modulation signal of a PSK system and transmits it by radio to the base station.

In a digital cellular apparatus at present, the π/4 shift QPSK is adopted as the modulation system for a modulation signal. According to the π/4 shift QPSK, a phase variation is shifted by π/4 from that of the QPSK wherein phase modulation is performed at intervals of 90 degrees and digital data of 2 bits are represented by four points on a complex plane. Since a modulation signal does not pass the origin of the complex plane as seen in FIGS. 17 and 18, fluctuation of envelope values is reduced.

However, with a digital cellular apparatus which is carried by and moved with a user, when it receives by radio and demodulates a modulation signal of the PSK system transmitted thereto, by a multi-path effect arising from reflections of radio waves from buildings therearound or a Doppler effect arising from movement of the apparatus itself, the frequency of the modulation signal which originally is fixed is fluctuated.

Therefore, in a digital cellular apparatus or the like, it is necessary to adjust the reception frequency of a modulation signal. When the reception frequency is to be adjusted in this manner, in a popular digital cellular apparatus, a radio modulation signal received once by a communication antenna is converted into an I/F signal of a predetermined frequency by an IF amplifier, and a rising edge of the I/F signal is detected by an edge detection circuit.

Such rising edges are counted by a counter circuit in response to a reference clock of a reference oscillator, and phase data is detected from the modulation signal in a cycle of a symbol clock by a register circuit based on a result of the counting. An error of the phase data is sampled out in the cycle of the symbol clock and cumulatively added for an interval of a period of a time slot, and the reference clock of the reference oscillator is varied by a PLL (Phase Locked Loop) circuit so that the phase error cumulatively added in this manner may converge within a predetermined allowance range to adjust the reception frequency.

After the adjustment of the reference frequency of the modulation signal is completed in such a manner as described above, frame synchronization of the modulation signal should subsequently be established. In this instance, since, in the modulation signal, predetermined bit data is contained at a predetermined position of a frame, the predetermined bit data is detected from the received modulation signal to establish frame synchronization.

More particularly, first bit data and second bit data are sampled out for each frame in a cycle of the symbol clock from the modulation signal first, and then a frame correlation value is calculated from the first bit data while CRC calculation is executed with the second bit data. Then, frame synchronization is established in response to results of the calculation.

After the adjustment of the reception frequency is completed and frame synchronization of the modulation signal is established in such a manner as described above, since a condition wherein phase data can be detected well from the received radio modulation signal is reached, the phase of the received radio modulation signal can be demodulated into a digital signal to reproduce a speech signal and so forth.

It is to be noted that some of digital cellular apparatus at present apply a diversity system for such radio reception of a modulation signal as described above. In a digital cellular apparatus which adopts this diversity system, a pair of communication antennae are arranged in a predetermined spaced relationship from each other and a radio modulation signal is received by the communication antennae. Electric field strengths of ratio reception of the communication antennae are detected individually, and one of the communication antennae which exhibits a higher one of the electric field strengths is used for radio reception of the apparatus.

While such a digital cellular apparatus or the like as described above can receive and demodulate a radio modulation signal of a PSK system transmitted thereto by radio, radio receiving apparatus at present have various disadvantages.

For example, while the digital cellular apparatus or the like samples out and cumulatively adds the phase error of a modulation signal in a cycle of a symbol clock upon starting of radio communication in order to adjust the reception frequency of the modulation signal as described above, this complicates processing for the calculation of the phase error. Further, if the reception condition deteriorates in the proximity of a sampling timing, then a result of the sampling becomes noise, and consequently, the speed until the adjustment of the reception frequency is completed drops.

Further, while the digital cellular apparatus or the like samples out, in order to establish frame synchronization, bit data for each frame in the cycle of the symbol clock from the modulation signal and executes calculation of a frame correlation value and CRC calculation, also this drops the speed in which frame synchronization is established if the reception condition deteriorates in the proximity of a sampling timing.

Particularly, while the adjustment of the reception frequency is repeated in a predetermined cycle, at a point of time when frame synchronization is established, a phase error is sampled out from the modulation signal at a particular timing corresponding to a synchronizing frame. Accordingly, if the sampling timing is in the proximity of a phase variation of the modulation signal, then it is difficult to detect the phase error well and the reception performance is deteriorated.

With a digital cellular apparatus at present, it is prescribed to adjust the reception frequency until the frequency deviation becomes smaller than 0.3 ppm (part per million). However, in order to realize this, a reference oscillator is required to have a highly stable output frequency, and this drops the productivity of digital cellular apparatus.

In order to overcome the disadvantage just described, it is a common practice to perform AFC (Automatic Frequency Control) processing for detection data of a phase error to produce digital data of a plurality of bits, convert the digital data into analog data and input resulting data to a TCXO (Temperature Compensated Crystal Oscillator) of the VC (Voltage Controlled) type so that the frequency of a reference clock to be outputted from the TCXO of the VC type is adjusted with a high degree of accuracy.

However, with a conventional digital cellular apparatus, adjustment of the reception frequency with the reference clock adjusted in this manner is executed fully even at a point of time before frame synchronization is established immediately after operation of the apparatus is started. Consequently, high grade data processing is executed even from a point of time at which no such processing is required. Consequently, the burden of adjustment of the reception frequency is increased idly and the speed is dropped.

Further, in a popular digital cellular apparatus, as described above, a received radio modulation signal is converted into an I/F signal of a predetermined signal first, and then rising edges are counted in response to a reference clock, whereafter phase data is detected from the modulation signal and adjustment of the reception frequency, establishment of frame synchronization and so forth are executed.

Further, while, in a conventional digital cellular apparatus, the frequencies of a reference clock of a reference oscillator and an intermediate frequency of an I/F amplifier are different depending upon the specifications of products, if the ratios of the intermediate frequency of the I/F amplifier and the symbol clock of the modulation signal are not equal to integral numbers of times that of the reference clock, then an error occurs with a detection signal of a phase error and so forth.

Consequently, a reference clock and an intermediate frequency are conventionally set in response to a symbol clock of a modulation signal. However, this lowers the degree of freedom of a device which can be used as the reference oscillator or the I/F amplifier and deteriorates the total productivity where a large number of types of digital cellular apparatus are produced.

Further, while a product of a digital cellular apparatus which adopts a diversity system as described above is available, with such a digital cellular apparatus as just described, since one of a pair of communication antennae is selectively used in response to an electric field strength, for example, in a case wherein the electric field strength is high due to noise, that one of the communication antennae which is not suitable because of the noise is selected.

In order to eliminate the disadvantage just described, also a system wherein a pair of reception signals are diversity composed in response to a ratio of electric field strengths of radio reception of a pair of communication antennae has been proposed. However, a detailed technique which realizes the system appropriately with a practical structure has not been proposed as yet.

SUMMARY OF THE INVENTION

It is an object of the present invention to provide a radio receiving method and apparatus by which adjustment of a reception frequency can be completed at a high speed without requiring a reference clock whose oscillation frequency is extremely high.

It is another object of the present invention to provide a radio receiving method and apparatus by which frame synchronization can be established at a high speed even when a reception condition is bad.

It is a further object of the present invention to provide a radio receiving method and apparatus by which a reception performance of a modulation signal is good.

It is a still further object of the present invention to provide a radio receiving method and apparatus wherein the degree of freedom of an intermediate frequency of an I/F amplifier or a reference clock of a reference oscillator is good.

It is a yet further object of the present invention to provide a radio receiving method and apparatus by which a technique of diversity composing a pair of reception signals in response to a ratio between electric field strengths of radio reception of a pair of communication antennae can be realized.

It is an additional object of the present invention to provide a method of setting a correction parameter to a radio receiving method and apparatus wherein the cycle of a reference clock of a reference oscillator need not be changed even if the cycle of a signal output of an I/F amplifier is changed.

In order to attain the object described above, according to an aspect of the present invention, there is provided a radio receiving method wherein a radio modulation signal of a PSK system transmitted by radio with a predetermined frequency is received and the reception frequency of the modulation signal is adjusted to a transmission frequency, comprising the steps of receiving a radio modulation signal of the PSK system at random, producing a sampling clock of a predetermined frequency, sampling out phase data out from the received radio modulation signal in a cycle of the sampling clock, cumulatively adding the phase data thus sampled out for a predetermined period, and adjusting the reception frequency so that a calculation result of the cumulative addition may satisfy a predetermined allowance range. In the radio receiving method, the reception frequency of a received radio modulation signal can be adjusted by simple processing without detecting a phase error from the received radio modulation signal.

It is to be noted that the modulation signal in the present invention permits various radio signals of various numbers of phases modulated by a PSK system and permits, for example, a modulation signal of a π/4 shift QPSK system. Further, the phase data of a modulation signal in the present invention is a general term for various data relating to a phase of a modulation signal and permits, for example, analog or digital data representing a phase variation amount, a phase difference, a phase itself or the like.

The radio receiving method may be constructed such that the sampling clock is produced so as to have a cycle equal to a fraction of that of a symbol clock of the modulation signal, and the phase data is sampled out from the modulation signal in the cycle of the sampling clock. In the radio receiving method, sampling out of the phase data of the modulation signal is performed at a timing of a cycle equal to a fraction of that of the symbol clock, that is, the cycle of the phase variation, of the modulation signal. Consequently, adjustment of the reception frequency can be completed at a high speed. Besides, in order to realize this, it is not necessary to produce a sampling clock from a reference clock which is stable with a high degree of accuracy.

The radio receiving method may be further constructed such that the modulation system of the modulation signal is a π/4 shift QPSK system, and the sampling clock is produced so as to have a cycle equal to one fourth that of the symbol clock of the modulation signal. In the radio receiving method, since the sampling clock which has a cycle equal to one fourth that of the symbol clock of the modulation signal whose modulation system is a π/4 shift QPSK system is produced, the modulation signal of the π/4 shift QPSK system can be sampled at a timing optimum to adjustment of the reception frequency by accumulation of the phase data.

According to another aspect of the present invention, there is provided a radio receiving method wherein a radio modulation signal of a PSK system transmitted with predetermined bit data contained at a predetermined position of a frame is received and the predetermined bit data is detected from the received radio modulation signal to establish frame synchronization, comprising the steps of receiving a radio modulation signal of the PSK system, producing a sampling clock of a cycle equal to a fraction of that of the received radio modulation signal, sampling out the predetermined bit data in the period of the sampling clock from the received radio modulation signal, and establishing frame synchronization in response to the sampled out bit data. In the radio receiving method, establishment of frame synchronization is executed with bit data sampled out at a timing of a cycle equal to a fraction of that of the symbol clock, that is, the cycle of the phase variation, of the modulation signal. In other word, bit data to be utilized for establishment of frame synchronization can be sampled out at a timing of a cycle equal to a fraction of that of the phase variation. Consequently, establishment of frame synchronization can be performed at a high speed.

According to a further aspect of the present invention, there is provided a radio receiving method wherein a radio modulation signal of a PSK system transmitted with predetermined bit data contained at a predetermined position of a frame is received and the predetermined bit data is detected from the received radio modulation signal to establish frame synchronization, comprising the steps of receiving a radio modulation signal of the PSK system, producing a sampling clock of a cycle equal to a fraction of that of the received radio modulation signal, sampling out first bit data in the cycle of the sample clock from the received radio modulation signal, calculating a frame correlation value from the sampled out first bit data, sampling out second bit data in the cycle of the sampling clock from the modulation signal, executing CRC calculation with the sampled out second bit data and second bit data set in advance, and establishing frame synchronization in response to the frame correlation value and a result of the CRC calculation. In the radio receiving method, first and second bit data to be utilized for calculation of a frame correlation value and CRC calculation are sampled out at a timing of a cycle equal to a fraction of that of the phase variation of the modulation signal. Consequently, establishment of frame synchronization can be completed at a high speed.

According to a still further aspect of the present invention, there is provided a radio receiving method wherein a radio modulation signal of a PSK system transmitted with a predetermined frequency is received and a phase error between radio transmission and radio reception of the modulation signal is detected, and then the received radio modulation signal is synchronously demodulated based on the phase error, comprising the steps of receiving a radio modulation signal of the PSK system, producing a sampling clock of a cycle equal to a fraction of that of the received modulation signal, detecting a phase error in the cycle of the sampling clock from the received radio modulation signal, cumulatively adding the phase error thus detected for a predetermined period, and setting a detection timing of the phase error at which a calculation result of the cumulative addition becomes minimum. In the radio receiving method, since a detection timing of the phase error at which a calculation result of the cumulative addition becomes minimum is set, after this setting is performed, a phase error of the modulation signal is detected at a detection timing at which a calculation result of the cumulative addition becomes minimum. Consequently, it is prevented that the phase error of the modulation signal is detected at a timing at which it increases because of an influence of the phase variation or the like. Accordingly, the phase error can be detected at an optimum timing and the reception performance of the modulation signal can be improved.

According to a yet further aspect of the present invention, there is provided a radio receiving method wherein a radio modulation signal of a PSK system transmitted with a predetermined frequency is received and a phase error between radio transmission and radio reception of the modulation signal is detected, and then the received radio modulation signal is synchronously demodulated based on the phase error, comprising the steps of receiving a modulation signal of the PSK system, producing a sampling clock of a cycle equal to a fraction of that of the received radio modulation signal, detecting a phase error in the cycle of the sampling clock from the received radio modulation signal, cumulatively adding the phase error thus detected for a predetermined period, and synchronously demodulating the modulation signal with the cumulatively added phase error. In the radio receiving method, synchronous demodulation is executed based on the phase error sampled out at a timing of a cycle equal to a fraction of that of the phase variation of the modulation signal. Thus, since the phase error to be utilized for synchronous demodulation of the modulation signal can be sampled out at a timing of a cycle equal to a fraction of that of the phase variation, synchronous demodulation of the modulation signal can be completed at a high speed.

According a yet further aspect of the present invention, there is provided a radio receiving method wherein a radio modulation signal of a PSK system transmitted with a predetermined frequency is received and a phase error between radio transmission and radio reception of the modulation signal is detected, and then the received radio modulation signal is synchronously demodulated based on the phase error, comprising the steps of receiving a radio modulation signal of the PSK system, producing a sampling clock of a cycle equal to a fraction of that of the received radio modulation signal, detecting a phase error in the cycle of the sampling clock from the received radio modulation signal, cumulatively the phase error thus detected for a predetermined period, setting a detecting timing of the phase error at which the cumulatively added phase error becomes minimum, and synchronously demodulating the modulation signal with the phase error detected at the set timing and cumulatively added. In the radio receiving method, since the phase error is detected at a timing at which a result of the accumulation of the phase error which is sampled out at a timing of a cycle equal to a fraction of that of the symbol clock becomes minimum, the phase error is prevented from being detected at a timing at which it increases because of an influence of the phase variation or the like. Further, since the phase error to be utilized for synchronous demodulation of the modulation signal can be sampled out at a timing of a cycle equal to a fraction of that of the phase variation, synchronous demodulation of the modulation signal can be completed at a high speed and the reception performance of the modulation signal can be improved.

Preferably, the radio receiving methods are constructed such that the modulation system of the modulation signal is a π/4 shift QPSK system, and the sampling clock is produced in a cycle equal to one eighth that of a symbol clock of the modulation signal. In the radio receiving method, since the sampling clock whose cycle is one eighth that of the symbol clock of the modulation signal whose modulation system is a π/4 shift QPSK system is produced, the modulation signal of the π/4 shift QPSK system can be sampled at an optimum timing.

According to a yet further aspect of the present invention, there is provided a radio receiving method wherein a radio modulation signal of a PSK system transmitted with a predetermined frequency is received and phase data is differentially detected from the modulation signal, comprising the steps of receiving a radio modulation signal of the PSK system, producing a sampling clock of a cycle equal to a fraction of that of the received radio modulation signal, differentially detecting phase data in the cycle of the sampling clock from the received radio modulation signal, and removing bit data set in advance from the differentially detected phase data. In the radio receiving method, an effective part of the modulation signal can be extracted from the differentially detected phase data, and consequently, the phase data of the modulation signal can be adjusted to an optimum dynamic range.

According to a yet further aspect of the present invention, there is provided a radio receiving method wherein a radio modulation signal of a PSK system transmitted with a predetermined frequency is received and phase data of the modulation signal is detected, comprising the steps of receiving a radio modulation signal of the PSK system, converting the received radio modulation signal into an intermediate frequency signal of a predetermined cycle, producing a reference clock of a predetermined cycle, producing a sampling clock of a cycle equal to a fraction of that of the reference signal from the reference clock, detecting phase data in the cycle of the sampling clock from the intermediate frequency signal, and correcting the phase data with a correction parameter corresponding to frequency differences among the symbol clock of the modulation signal, the intermediate frequency signal, the reference clock and the sampling clock. In the radio receiving method, an offset which occurs with a result of detection of the phase error from cycle differences among the symbol clock of the modulation signal, the intermediate frequency signal, the reference clock and the sampling clock is corrected. Consequently, the reception performance of the modulation signal can be improved and the intermediate frequency signal and the reference clock can be varied freely.

The radio receiving method may be constructed such that one of a plurality of kinds of sampling clocks having cycles equal to fractions of that of the symbol clock is switchably produced at a ratio corresponding to the modulation system of the modulation signal, and one of a plurality of kinds of correction parameters set in advance is selectively used in response to switching of the sampling clocks. In the radio receiving method, the modulation signal is sampled at an optimum timing corresponding to the modulation system of the same, and even if the sampling clock is switched to another sampling clock, an offset of a result of detection of the phase error is corrected appropriately by switching of the correction parameter corresponding to the switching of the sampling clock.

Preferably, the modulation system of the modulation signal is a π/4 shift QPSK system, and one of a plurality of sampling clocks having frequencies equal to one fourth and one eighth that of the symbol clock of the modulation signal is selectively produced. In the radio receiving method, since the sampling clock whose cycle is one eighth that of the symbol clock of the modulation signal whose modulation system is a π/4 shift QPSK system is produced, the modulation signal of the π/4 shift QPSK system can be sampled at an optimum timing. Consequently, even if the sampling clock is switched, a result of detection of the phase error can be corrected appropriately.

According to a yet further aspect of the present invention, there is provided a radio receiving method, comprising the steps of registering a plurality of diversity ratios in advance, receiving a radio signal by a pair of communication antennae, converting electric field strengths of radio reception of the pair of communication antennae individually from analog into digital data, calculating difference data from the pair of digital data, reading out one of the diversity ratios registered in advance using the calculated difference data as address data, and diversity composing the pair of received radio signals in response to the read out diversity ratio. In the radio receiving method, radio signals received by the pair of communication antennae are diversity composed at an appropriate diversity ratio in response to a difference in electric field strength. Consequently, the reception performance of the radio signal can be improved.

According to a yet further aspect of the present invention, there is provided a radio receiving apparatus which receives a radio modulation signal of a PSK system transmitted with a predetermined frequency and adjusts a reception frequency of the modulation signal corresponding to a transmission frequency, comprising radio reception means for random receiving a radio modulation signal of the PSK system, clock production means for producing a sampling clock of a predetermined cycle, phase sampling means for sampling out phase data in the cycle of the sampling clock produced by the clock production means from the modulation signal received by the radio reception means, phase accumulation means for cumulatively adding the phase data sampled out by the phase sampling means for a predetermined period, and reception adjustment means for adjusting a reception frequency so that a calculation result of the cumulative addition of the phase accumulation means may satisfy a predetermined allowance range.

In the radio receiving apparatus, a modulation signal of the PSK system is received at random by the radio reception means, and a sampling clock of a predetermined frequency is produced by the clock production means. Then, phase data is sampled out from the received radio modulation signal in a cycle of the sampling clock. The phase data thus sampled out is cumulatively added for a predetermined period, and the reception frequency is adjusted by the reception adjustment means so that a calculation result of the cumulative addition may satisfy a predetermined allowance range. Consequently, the reception frequency of a received radio modulation signal can be adjusted without detecting a phase error from the received radio modulation signal.

It is to be noted that the individual components in the present invention are required only to be constructed so as to realize the functions required therefor and allow, for example, hardware for exclusive use, a computer to which appropriate functions are provided by a program, functions realized in the inside of a computer by an appropriate program, and any combination of them.

The radio receiving apparatus may be constructed such that the clock production means produces a sampling clock of a cycle equal to a fraction of that of a symbol clock of the modulation signal, and the phase sampling means samples out the phase data from the modulation signal in the cycle of the sampling clock produced by the clock production means.

In the radio receiving apparatus, the sampling clock is produced by the clock production means so as to have a cycle equal to a fraction of that of the symbol clock of the modulation signal, and the phase data is sampled out from the modulation signal in the cycle of the sampling clock by the phase sampling means. Accordingly, sampling out of the phase data of the modulation signal is performed at a timing of a cycle equal to a fraction of that of the symbol clock, that is, the period of the phase variation, of the modulation signal. Consequently, adjustment of the reception frequency can be completed at a high speed. Besides, in order to realize this, it is not necessary to produce a sampling clock from a reference clock which is stable with a high degree of accuracy. Consequently, the productivity of the radio receiving apparatus can be improved.

The radio receiving apparatus may be further constructed such that the clock production means produces a sampling clock of a cycle equal to a fraction of that of the symbol clock at a ratio corresponding to the modulation system of the modulation signal. In the radio receiving apparatus, a sampling clock is produced with a cycle equal to a fraction of that of the symbol clock at a ratio corresponding to the modulation system of the modulation signal by the clock production means. Consequently, a sampling clock can be produced with a cycle optimum to the modulation system of the modulation signal.

The radio receiving apparatus may be further constructed such that the modulation system of the modulation signal is a π/4 shift QPSK system, and the clock production means produces a sampling clock of a cycle equal to one fourth that of the symbol clock of the modulation signal. In the radio receiving apparatus, since the sampling clock which has a cycle equal to one fourth that of the symbol clock of the modulation signal whose modulation system is a π/4 shift QPSK system is produced, phase data is sampled out in a cycle equal to one fourth that of the symbol clock of the modulation signal from the modulation signal of the π/4 shift QPSK system. Consequently, the modulation signal of the π/4 shift QPSK system can be sampled at a timing optimum to adjustment of the reception frequency by accumulation of the phase data.

According to a yet further aspect of the present invention, there is provided a radio receiving apparatus wherein a radio modulation signal of a PSK system transmitted with predetermined bit data contained at a predetermined position of a frame is received and the predetermined bit data is detected from the received radio modulation signal to establish frame synchronization, comprising radio reception means for radio receiving a radio modulation signal of the PSK system, clock production means for producing a sampling clock of a cycle equal to a fraction of that of a symbol clock of the modulation signal received by the radio reception means, bit sampling means for sampling out predetermined bit data from the radio signal received by the radio reception means in the cycle of the sampling clock produced by the clock production means, and frame synchronization means for establishing frame synchronization corresponding to the bit data sampled out by the bit sampling means.

In the radio receiving apparatus, a radio modulation signal of the PSK system is received by the radio reception means, and a sampling clock of a cycle equal to a fraction of that of the received radio modulation signal is produced by the clock production means. Then, the predetermined bit data is sampled out in the period of the sampling clock from the received radio modulation signal by the bit sampling means, and frame synchronization is established corresponding to the sampled out bit data by the frame synchronization means. Consequently, establishment of frame synchronization is executed with bit data sampled out at a timing of a cycle equal to a fraction of that of the symbol clock, that is, the cycle of the phase variation, of the modulation signal. In other word, bit data to be utilized for establishment of frame synchronization can be sampled out at a timing of a cycle equal to a fraction of that of the phase variation. Consequently, establishment of frame synchronization can be performed at a high speed.

The radio receiving apparatus may be constructed such that the bit sampling means samples out first bit data and second bit data from the modulation signal in the cycle of the sampling clock, and the frame synchronization means calculates a frame correlation value from the sampled out first bit data, executes CRC calculation with the second bit data, and establishes frame synchronization corresponding to the frame correlation value and a result of the CRC calculation.

In the radio receiving apparatus, when first bit data is sampled out in the cycle of the sampling clock from the modulation signal by the bit sampling means, a frame correlation value is calculated from the thus sampled out first bit data by the frame synchronization means. Then, since second bit data is sampled out in the period of the sampling clock from the modulation signal by the bit sampling means, CRC calculation is executed with the thus sampled out second bit data by the frame synchronization means, and frame synchronization is established corresponding to the frame correlation value and a result of the CRC calculation. Consequently, sampling out of first and second bit data to be utilized for calculation of a frame correlation value and CRC calculation is executed at a timing of a cycle equal to a fraction of that of the phase variation of the modulation signal. As a result, establishment of frame synchronization can be completed at a high speed.

According to a yet further aspect of the present invention, there is provided a radio receiving apparatus wherein a radio modulation signal of a PSK system transmitted with a predetermined frequency is received and a phase error between radio transmission and radio reception of the modulation signal, and then the received radio modulation signal is synchronously demodulated based on the phase error, comprising radio reception means for receiving a radio modulation signal of the PSK system, clock production means for producing a sampling clock of a cycle equal to a fraction of that of a symbol clock of the modulation signal received by the radio reception means, error detection means for detecting a phase error in the cycle of the sampling clock produced by the clock production means from the modulation signal received by the radio reception means, error accumulation means for cumulatively adding the phase error detected by the error detection means for a predetermined period, and timing control means for setting a detection timing of the phase error at which a calculation result of the cumulative addition by the error accumulation means becomes minimum to the error detection means.

In the radio receiving apparatus, a radio modulation signal of the PSK system is received by the radio reception means, and a sampling clock of a cycle equal to a fraction of that of the received radio modulation signal is produced by the clock production means. Then, a phase error is detected in the cycle of the sampling clock from the received radio modulation signal by the error detection means. The phase error thus detected is cumulatively added for a predetermined period by the error accumulation means, and a detection timing of the phase error at which a calculation result of the cumulative addition becomes minimum is set to the error detection means by the timing control means. Consequently, since a detection timing of the phase error at which a calculation result of the cumulative addition becomes minimum is set to the error detection means, after this setting is performed, a phase error of the modulation signal is detected at a detection timing at which a calculation result of the cumulative addition becomes minimum. Consequently, it is prevented that the phase error of the modulation signal is detected at a timing at which it increases because of an influence of the phase variation or the like. Accordingly, the phase error can be detected at an optimum timing and the reception performance of the modulation signal can be improved.

According to a yet further aspect of the present invention, there is provided a radio receiving apparatus wherein a radio modulation signal of a PSK system transmitted with a predetermined frequency is received and a phase error between radio transmission and radio reception of the modulation signal is detected, and then the received radio modulation signal is synchronously demodulated based on the phase error, comprising radio reception means for receiving a radio modulation signal of the PSK system, clock production means for producing a sampling clock of a cycle equal to a fraction of that of a symbol clock of the modulation signal received by the radio reception means, error detection means for detecting a phase error in the cycle of the sampling clock produced by the clock production means from the modulation signal received by the radio reception means, error accumulation means for cumulatively adding the phase error detected by the error detection means for a predetermined period, and synchronous demodulation means for synchronously demodulating the modulation signal with the phase error cumulatively added by the error accumulation means.

In the radio receiving apparatus, a radio modulation signal of the PSK system is received by the radio reception means, and a sampling clock of a cycle equal to a fraction of that of the received radio modulation signal is produced by the clock production means. Then, a phase error is detected in the cycle of the sampling clock from the received radio modulation signal by the error detection means. Further, the phase error thus detected is cumulatively added for a predetermined period by the error accumulation means, and the modulation signal is synchronously demodulated with the cumulatively added phase error by the synchronous demodulation means. Consequently, synchronous demodulation is executed based on the phase error sampled out at a timing of a cycle equal to a fraction of that of the phase variation of the modulation signal. Thus, since the phase error to be utilized for synchronous demodulation of the modulation signal can be sampled out at a timing of a cycle equal to a fraction of that of the phase variation, synchronous demodulation of the modulation signal can be completed at a high speed.

According to a yet further aspect of the present invention, there is provided a radio receiving apparatus wherein a radio modulation signal of a PSK system transmitted with a predetermined frequency is received and a phase error between radio transmission and radio reception of the modulation signal is detected, and then the received radio modulation signal is synchronously demodulated based on the phase error, comprising radio reception means for receiving a radio modulation signal of the PSK system, clock production means for producing a sampling clock of a cycle equal to a fraction of that of a symbol clock of the modulation signal received by the radio reception means, error detection means for detecting a phase error in the cycle of the sampling clock produced by the clock production means from the modulation signal received by the radio reception means, error accumulation means for cumulatively adding the phase error detected by the error detection means for a predetermined period, timing control means for setting a detection timing of the phase error at which the cumulatively added phase error of the error accumulation means becomes minimum to the error detection means, and synchronous demodulation means for synchronously demodulating the modulation signal with the phase error detected by the error detection means at the timing set by the timing control means and cumulatively added by the error accumulation means.

In the radio receiving apparatus, a radio modulation signal of the PSK system is received by the radio reception means, and a sampling clock of a cycle equal to a fraction of that of the received radio modulation signal is produced by the clock production means. Further, a phase error is detected in the cycle of the sampling clock from the received radio modulation signal by the error detection means. The phase error thus detected is cumulatively added for a predetermined period by the error accumulation means, and a detecting timing of the phase error at which the cumulatively added phase error becomes minimum is set to the error detection means by the timing control means. After this setting is performed, the phase error is detected at the set timing by the error detection means. The phase error detected at this timing is cumulatively added for a predetermined period by the error accumulation means, and the modulation signal is synchronously demodulated with the cumulatively added phase error by the synchronous demodulation means. Consequently, synchronous demodulation is executed based on the phase error which is sampled out at a timing of a cycle equal to a fraction of that of the phase variation of the modulation signal. Since the phase error is detected at a timing at which a result of the accumulation of the phase error which is sampled out at a timing of a cycle equal to a fraction of that of the symbol clock becomes minimum, the phase error is prevented from being detected at a timing at which it increases because of an influence of the phase variation or the like. Further, since the phase error to be utilized for synchronization of the modulation signal can be sampled out at a timing of a cycle equal to a fraction of that of the phase variation, synchronous demodulation of the modulation signal can be completed at a high speed and the reception performance of the modulation signal can be improved.

The radio receiving apparatus may be constructed such that the clock production means produces a sampling clock of a cycle equal to a fraction of that of the symbol clock at a ratio corresponding to the modulation system of the modulation signal. In the radio receiving apparatus, a sampling clock of a cycle equal to a fraction of that of the symbol clock is produced at a ratio corresponding to the modulation system of the modulation signal by the clock production means. Consequently, the modulation signal can be sampled at a timing optimum to the modulation system.

Preferably, the radio receiving apparatus are constructed such that the modulation system of the modulation signal is a π/4 shift QPSK system, and the clock production means produces a sampling clock of a cycle equal to one eighth that of the symbol clock of the modulation signal. In the radio receiving apparatus, since the sampling clock whose cycle is one eighth that of the symbol clock of the modulation signal whose modulation system is a π/4 shift QPSK system is produced, the modulation signal of the π/4 shift QPSK system can be sampled at an optimum timing.

According to a yet further aspect of the present invention, there is provided a radio receiving apparatus wherein a radio modulation signal of a PSK system transmitted with a predetermined frequency is received and phase data is differentially detected from the modulation signal, comprising radio reception means for receiving a radio modulation signal of the PSK system, clock production means for producing a sampling clock of a predetermined cycle, phase detection means for differentially detecting phase data in the cycle of the sampling clock produced by the clock production means from the modulation signal received by the radio reception means, and signal adjustment means for removing bit data set in advance from the phase data differentially detected by the phase detection means.

In the radio receiving apparatus, a radio modulation signal of the PSK system is received by the radio reception means, and a sampling clock of a cycle is produced by the clock production means. Then, phase data is differentially detected in the cycle of the sampling clock from the received radio modulation signal by the phase detection means, and bit data set in advance is removed from the differentially detected phase data. Consequently, an effective part of the modulation signal can be extracted from the differentially detected phase data by the signal adjustment means, and consequently, the phase data of the modulation signal can be adjusted to an optimum dynamic range.

According to a yet further aspect of the present invention, there is provided a radio receiving apparatus wherein a radio modulation signal of a PSK system transmitted with a predetermined frequency is received and phase data is detected from the modulation signal, comprising radio reception means for receiving a radio modulation signal of the PSK system, I/F conversion means for converting the modulation signal received by the radio reception means into an intermediate frequency signal of a predetermined cycle, clock generation means for generating a reference clock of a predetermined cycle, clock production means for producing, from the reference clock generated by the clock generation means, a sampling clock of a cycle equal to a fraction of that of the reference clock, phase detection means for detecting phase data in the cycle of the sampling clock produced by the clock production means from the intermediate frequency signal outputted from the I/F conversion means, and signal correction means for correcting the phase data detected by the phase detection means with a correction parameter corresponding to frequency differences among the symbol clock of the modulation signal, the intermediate frequency signal, the reference clock and the sampling clock.

In the radio receiving apparatus, a radio modulation signal of the PSK system is received by the radio reception means, and the received radio modulation signal is converted into an intermediate frequency signal of a predetermined cycle by the I/F conversion means. A reference clock of a predetermined cycle is generated by the clock generation means, and a sampling clock of a cycle equal to a fraction of that of the reference signal is produced from the reference clock by the clock production means. Then, phase data is detected in the cycle of the sampling clock from the intermediate frequency signal by the phase detection means, and the phase data is corrected with a correction parameter corresponding to frequency differences among the symbol clock of the modulation signal, the intermediate frequency signal, the reference clock and the sampling clock by the signal correction means. Consequently, an offset which occurs with the phase data of the modulation signal from cycle differences among the clocks is corrected. Consequently, the reception performance of the modulation signal can be improved. Further, since various devices can be adopted freely for the I/F conversion means and the clock generation means, the productivity of the radio receiving apparatus can be improved.

The radio receiving apparatus may be constructed such that the clock production means selectively produces one of a plurality of kinds of sampling clocks having cycles equal to fractions of that of the symbol clock at a ratio corresponding to the modulation system of the modulation signal, and the signal correction means selectively uses one of a plurality of kinds of correction parameters set in advance in response to selective switching of the sampling clock by the clock production means.

In the radio reception apparatus, one of a plurality of kinds of sampling clocks having cycles equal to fractions of that of the symbol clock is produced at a ratio corresponding to the modulation system of the modulation signal by the clock production means, and one of a plurality of kinds of correction parameters set in advance is selectively used in response to selective switching of the sampling clocks. Accordingly, even if the sampling clock is switched to another sampling clock, an offset of the phase data of the modulation signal is corrected appropriately by switching of the correction parameter corresponding to the switching of the sampling clock.

Preferably, the radio receiving apparatus is constructed such that the modulation system of the modulation signal is a π/4 shift QPSK system, and the clock production means selectively produces one of sampling clocks having cycles equal to one fourth and one eighth that of the symbol clock of the modulation signal.

In the radio receiving apparatus, the sampling clock whose cycle is one fourth or one eighth that of the symbol clock of the modulation signal whose modulation system is a π/4 shift QPSK system is produced by the clock production means, the modulation signal of the π/4 shift QPSK system can be sampled at an optimum timing. Consequently, even if the sampling clock is switched, an offset of a result of detection of the phase error can be corrected appropriately.

According to a yet further aspect of the present invention, there is provided a radio receiving apparatus, comprising a pair of communication antennae for receiving a radio signal, a pair of A/D conversion means for converting electric field strengths of radio reception of the pair of communication antennae individually from analog to digital data, difference calculation means for calculating difference data from the pair of digital data individually from the pair of A/D conversion means, rate storage means in which a plurality of diversity ratios are registered in advance individually for predetermined address data, rate readout means for reading out one of the diversity ratios from the rate storage means using the difference data calculated by the difference calculation means as address data, and signal composition means for diversity composing the pair of radio signals received by the pair of communication antennae in response to the diversity ratio read out by the rate readout means.

In the radio receiving apparatus, a radio signal is received by the pair of communication antennae, and electric field strengths of radio reception of the pair of communication antennae are individually converted from analog into digital data by the A/D conversion means. Then, difference data is calculated from the pair of resulting digital data by the difference calculation means, and one of the diversity ratios registered in advance is read out from the rate storage means by the rate readout means using the difference data calculated by the difference calculation means as address data. Then, the radio signals received by the pair of communication antennae are diversity composed in response to the read out diversity ratio by the signal composition means. Consequently, radio signals received by the pair of communication antennae are diversity composed at an appropriate diversity ratio in response to a difference in electric field strength. Consequently, the reception performance of the radio signal can be improved.

The above and other objects, features and advantages of the present invention will become apparent from the following description and the appended claims, taken in conjunction with the accompanying drawings in which like parts or elements are denoted by like reference symbols.

BRIEF DESCRIPTION OF THE INVENTION

DESCRIPTION OF THE PREFERRED EMBODIMENT

Figure 1:
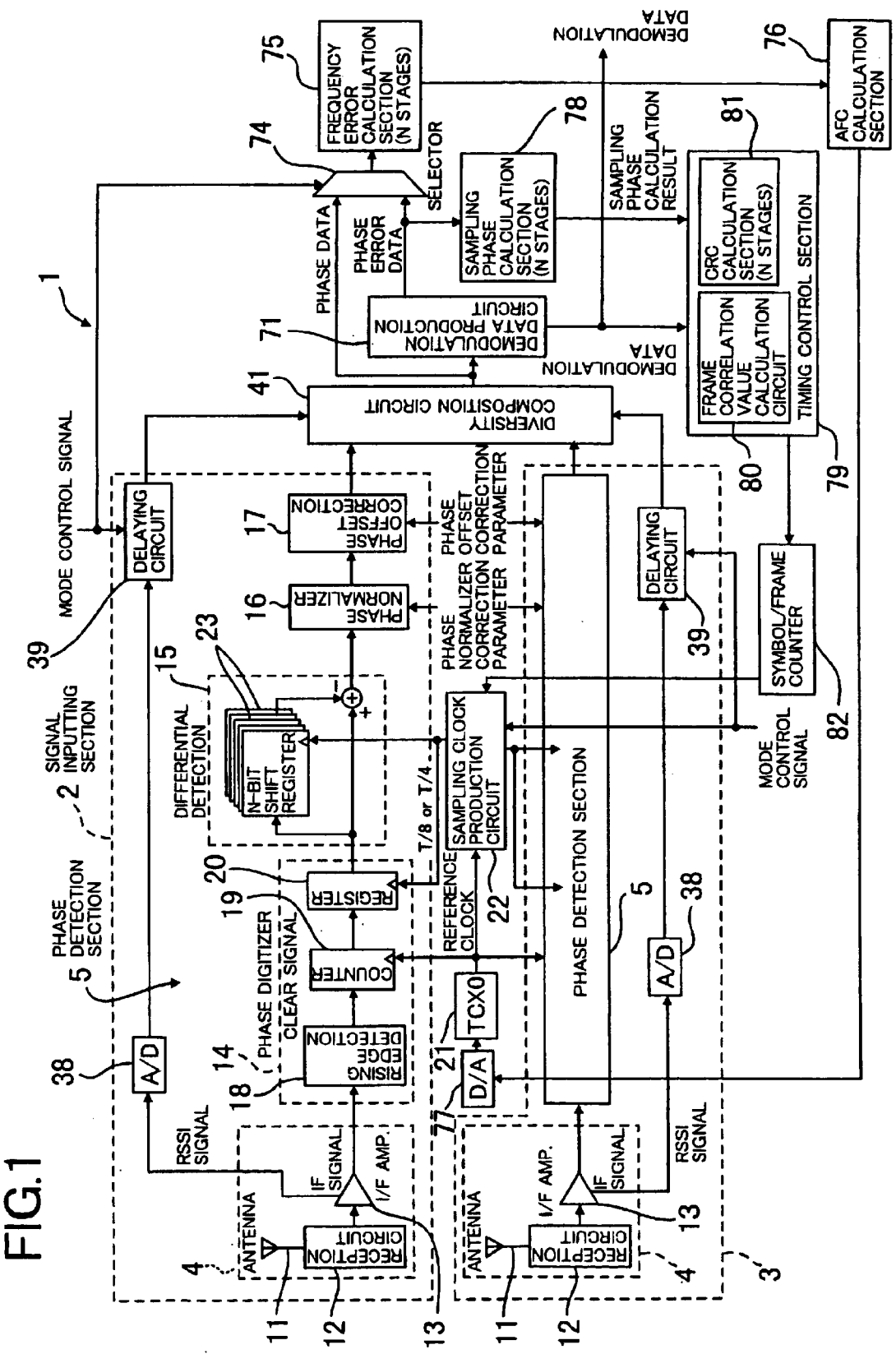
FIG. 1 is a block diagram showing a radio receiving apparatus of an embodiment of the present invention.

Referring first to FIG. 1, there is shown a radio receiving apparatus to which the present invention is applied. The radio receiving apparatus is generally denoted at 1 and is built in a digital cellular apparatus together with a radio transmission apparatus not shown. The radio receiving apparatus 1 is formed as an apparatus of the diversity system and has a pair of signal inputting sections 2 and 3. Each of the signal inputting sections 2 and 3 includes a radio reception section 4 and a phase detection section 5.

Each of the radio reception sections 4 has a communication antenna 11 which serves as radio reception means, and an I/F amplifier 13 which serves as I/F conversion means is connected individually to each of the communication antennae 11 through an individual reception circuit 12. The communication antennae 11 and the reception circuits 12 random receive, for example, a modulation signal of a $\pi/4$ shift QPSK system having a symbol clock whose frequency is 21 kHz. The I/F amplifiers 13 are each formed from, for example, a LOG amplifier and output the received modulation signals as I/F signals of a predetermined cycle with an intermediate frequency of 450 kHz.

A pair of phase detection sections 5 are individually connected the radio reception sections 4. Each of the phase detection sections 5 includes a phase digitizer 14 which serves as phase sampling means, a differential detection circuit 15 which serves as phase detection means, a phase normalizer 16 which serves as signal adjustment means, an offset correction circuit 17 which serves as signal correction means, and so forth, which are connected in order.

The phase digitizer 14 of each of the phase detection sections 5 includes an edge detection circuit 18, a counter circuit 19, a register circuit 20, and so forth. The edge detection circuit 18 of the phase digitizer is connected to the I/F amplifier 13 of the corresponding radio reception section 4. The counter circuit 19 is connected to the edge detection circuit 18, and the register circuit 20 is connected to the counter circuit 19.

In the radio receiving apparatus 1, a TCXO 21 of the VC type is provided as a single clock generation means which is used commonly by the signal inputting sections 2 and 3, and generates a reference clock of a predetermined cycle, for example, of 12.6 MHz. To this TCXO 21, a clock production circuit 22 which serves as clock production means is connected. The clock production circuit 22 produces a sampling clock of a cycle equal to a fraction of that of the reference clock from the reference clock.

In the radio receiving apparatus 1, the modulation system for a modulation signal is a $\pi/4$ shift QPSK system, and the clock production circuit 22 produces a sampling clock of a cycle equal to a fraction of that of the symbol clock at a ratio corresponding to the modulation system of the modulation signal. More particularly, the clock production circuit 22 selectively produces one of sampling clocks of two different cycles of one fourth and one eighth that of the symbol clock of a modulation signal in response to switching control of an operation mode which will be hereinafter described.

The singe TCXO 21 is connected to an input terminal for a clock signal of each of the counter circuits 19 of the phase digitizers 14, and also the singe clock production circuit 22 is connected to input terminals for a clock signal of the register circuits 20 of the phase digitizers 14.

The edge detection circuit 18 of each of the phase digitizers 14 detects a rising edge of a modulation signal inputted thereto as an I/F signal from the corresponding I/F amplifier 13, and the counter circuit 19 counts a result of the detection of a rising edge in the cycle of the reference clock. Since the corresponding register circuit 20 samples a result of the counting in the cycle of the sampling clock, the phase digitizer 14 samples out data of (a variation amount of) the phase in the cycle of the sampling clock produced by the clock production circuit 22 from a radio modulation signal received by the corresponding radio reception section 4.

Figure 2:
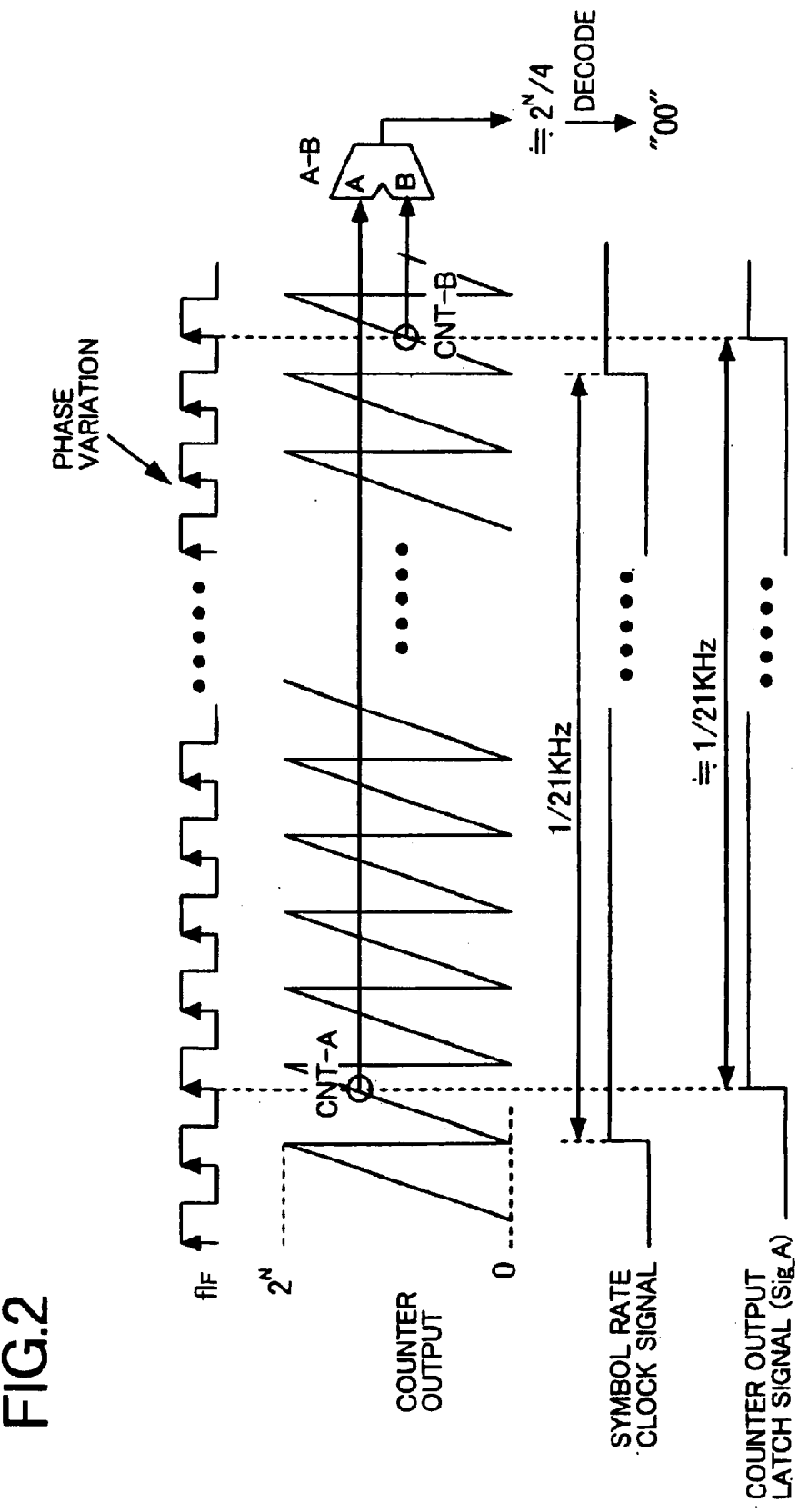
FIG. 2 is a schematic time chart illustrating operation of a differential detection circuit of the radio receiving apparatus of FIG. 1.

The differential detection circuit 15 connected to the phase digitizer 14 includes a plurality of shift registers 23 of a plurality of bits provided in parallel and is connected to an adder 24, and the clock production circuit 22 is connected also to the shift registers 23. The differential detection circuit 15 compares, as seen in FIG. 2, phase data of a modulation signal with that prior by one cycle in the cycle of the sampling clock and outputs data of a difference between them as differentially detected phase (difference) data.

Figure 3:
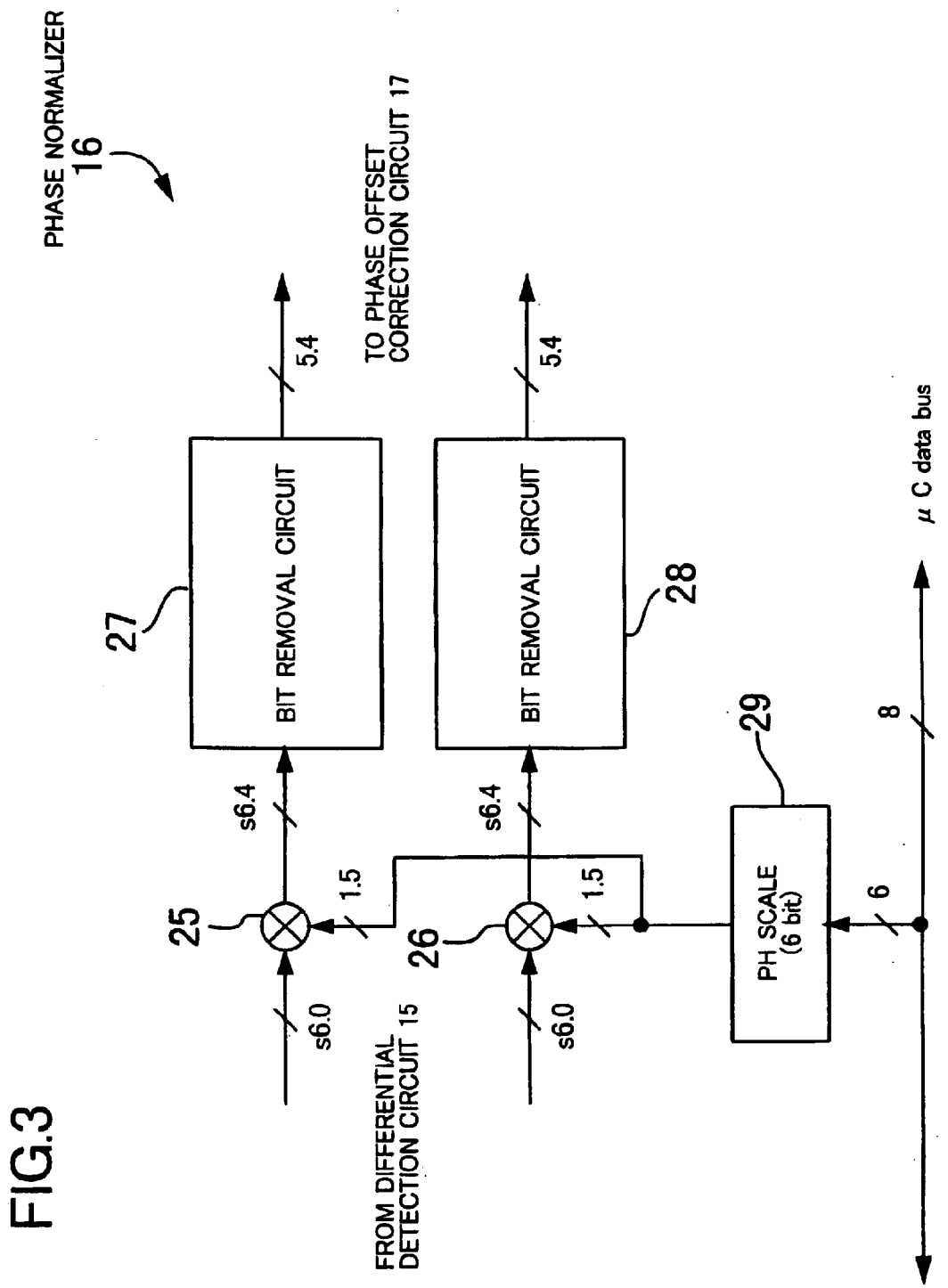
FIG. 3 is a block diagram showing a phase normalizer of the radio receiving apparatus of FIG. 1.

The phase normalizer 16 connected to the differential detection circuit 15 includes, as shown in FIG. 3, multipliers 25 and 26 and bit removal circuits 27 and 28 connected one by one in order in individual input routes of phase data of a modulation signal divided into the two series. A parameter generation circuit 29 is connected to the multipliers 25 and 26.

The parameter generation circuit 29 generates a correction parameter set in advance. The multipliers 25 and 26 multiply phase data of a modulation signal by the correction parameter, and each of the bit removal circuits 27 and 28 removes a sign bits and the MSB (Most Significant Bit) from the corresponding phase data multiplied by the correction parameter.

In short, the phase normalizer 16 corrects the differentially detected phase data of a modulation signal into a predetermined form by multiplication of the correction parameter, removes the bit data set in advance from the phase data to extract only effective parts, and adjusts the dynamic range of the phase data.

Figure 4:
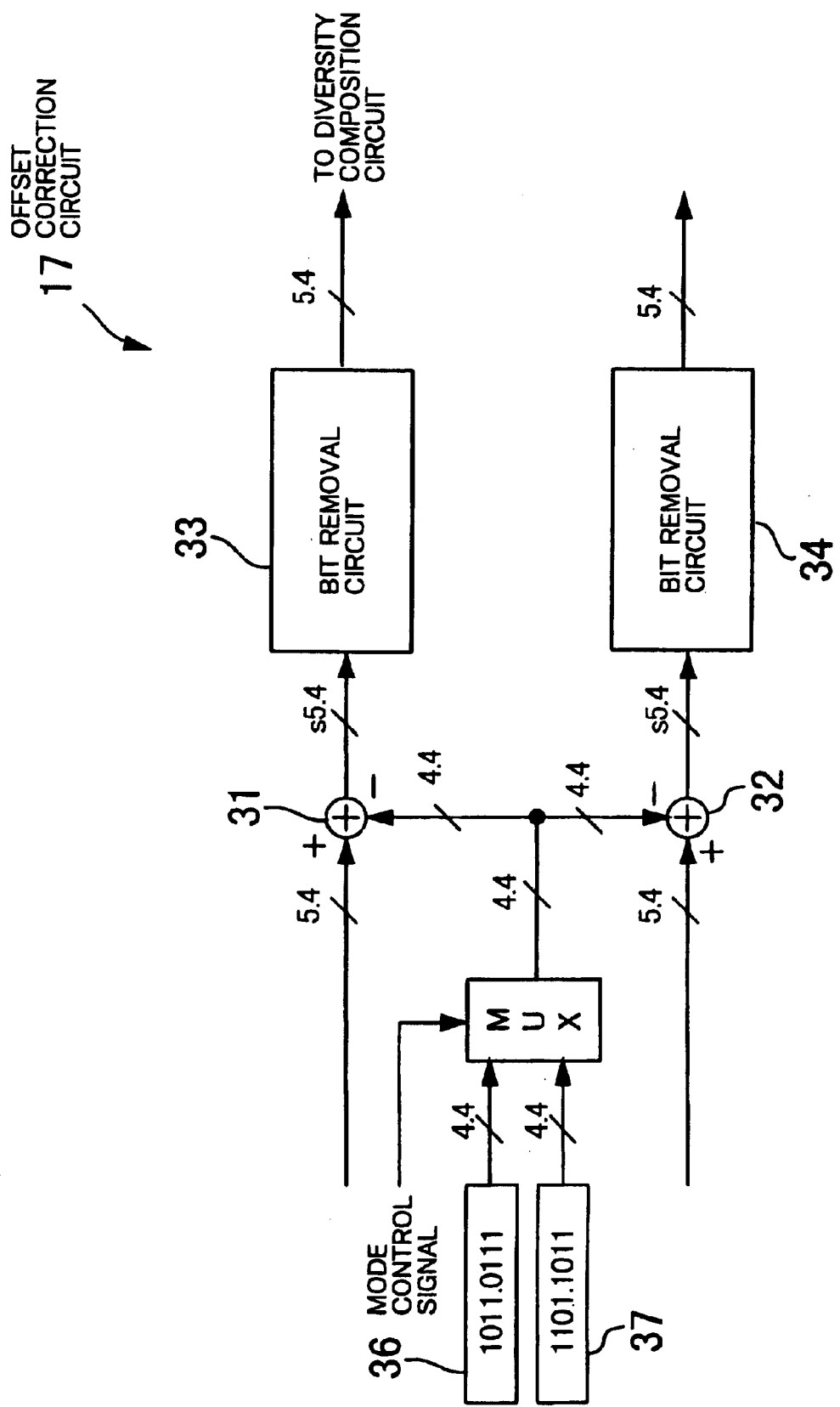
FIG. 4 is a block diagram showing an offset correction circuit of the radio receiving apparatus of FIG. 1.

Referring to FIG. 4, the offset correction circuit 17 includes adders 31 and 32 and bit removal circuits 33 and 34 connected one by one in each of the input routes of phase data of a modulation signal divided into the two series. A pair of parameter generation circuits 36 and 37 are connected to the adders 31 and 32 through a single multiplexer (MUX) 35.

The parameter generation circuits 36 and 37 generate correction parameters set in advance, and the multiplexer 35 selectively outputs one of the two correction parameters in response to switching control of an operation mode which will be hereinafter described. The adders 31 and 32 add a correction parameter selected by the multiplexer 35 to respective phase data, and the bit removal circuits 33 and 34 remove sign bits from the corrected phase data.

In short, the offset correction circuit 17 adds one of the two different correction parameters to phase data of a modulation signal and removes sign bits from resulting data to correct an offset which occurs with phase data from a difference in cycle among the symbol clock of the modulation signal, the I/F signal, the reference clock and the sampling clock.

Referring back to FIG. 1, also an A/D converter 38 which serves as A/D conversion means is connected to each of the I/F amplifiers 13 described above, and a data delaying circuit 39 is connected to the A/D converter 38. The A/D converter 38 A/D converts an electric field strength of radio reception of a modulation signal, and the data delaying circuit 39 delays data transmission of the electric field strength by a time of delay in transmission by the differential detection circuit 15.

Data output terminals of the offset correction circuits 17 of the signal inputting sections 2 and 3 having such a structure as described above are individually connected to a pair of data input terminals of a single diversity composition circuit 41. Meanwhile, data terminals of the data delaying circuits 39 of the signal inputting sections 2 and 3 are individually connected to a pair of control input terminals of the single diversity composition circuit 41.

Figure 5:
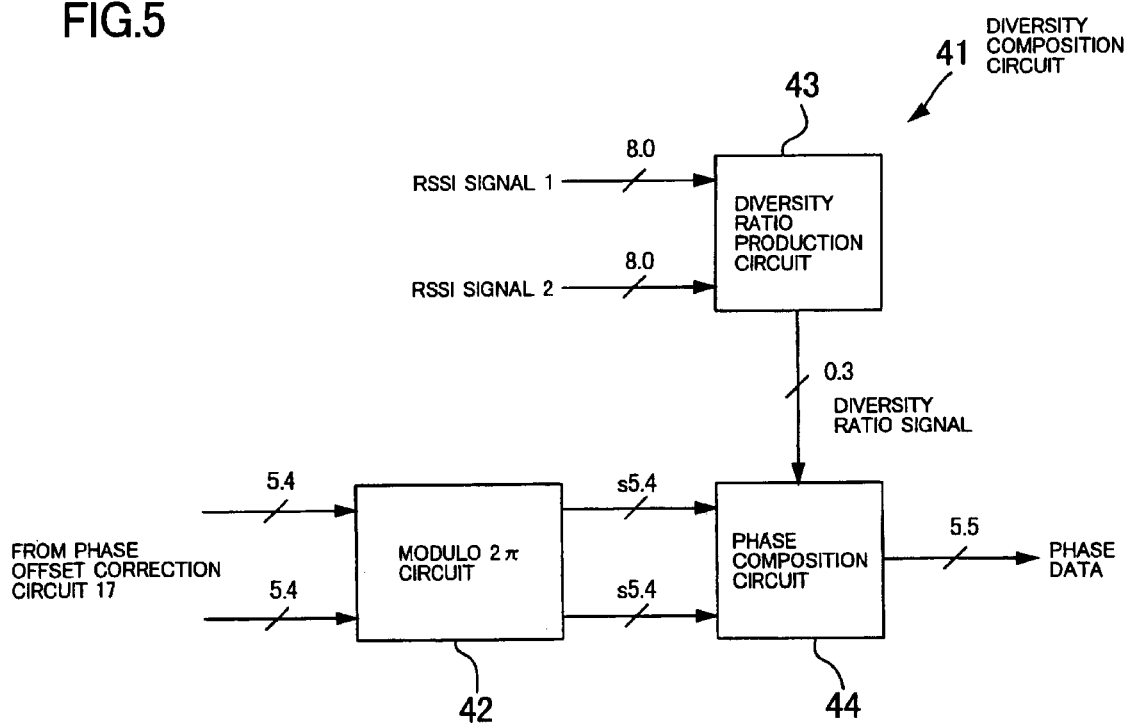
FIG. 5 is a block diagram showing a diversity composition circuit of the radio receiving apparatus of FIG. 1.

Referring to FIG. 5, the diversity composition circuit 41 includes a single modulo $2\pi$ circuit 42 to which the two offset correction circuits 17 are connected, and a single ratio production circuit 43 to which the two data delaying circuits 39 are connected. The two circuits 42 and 43 are connected to a phase composition circuit 44 which serves as signal composition means.

Figure 6:
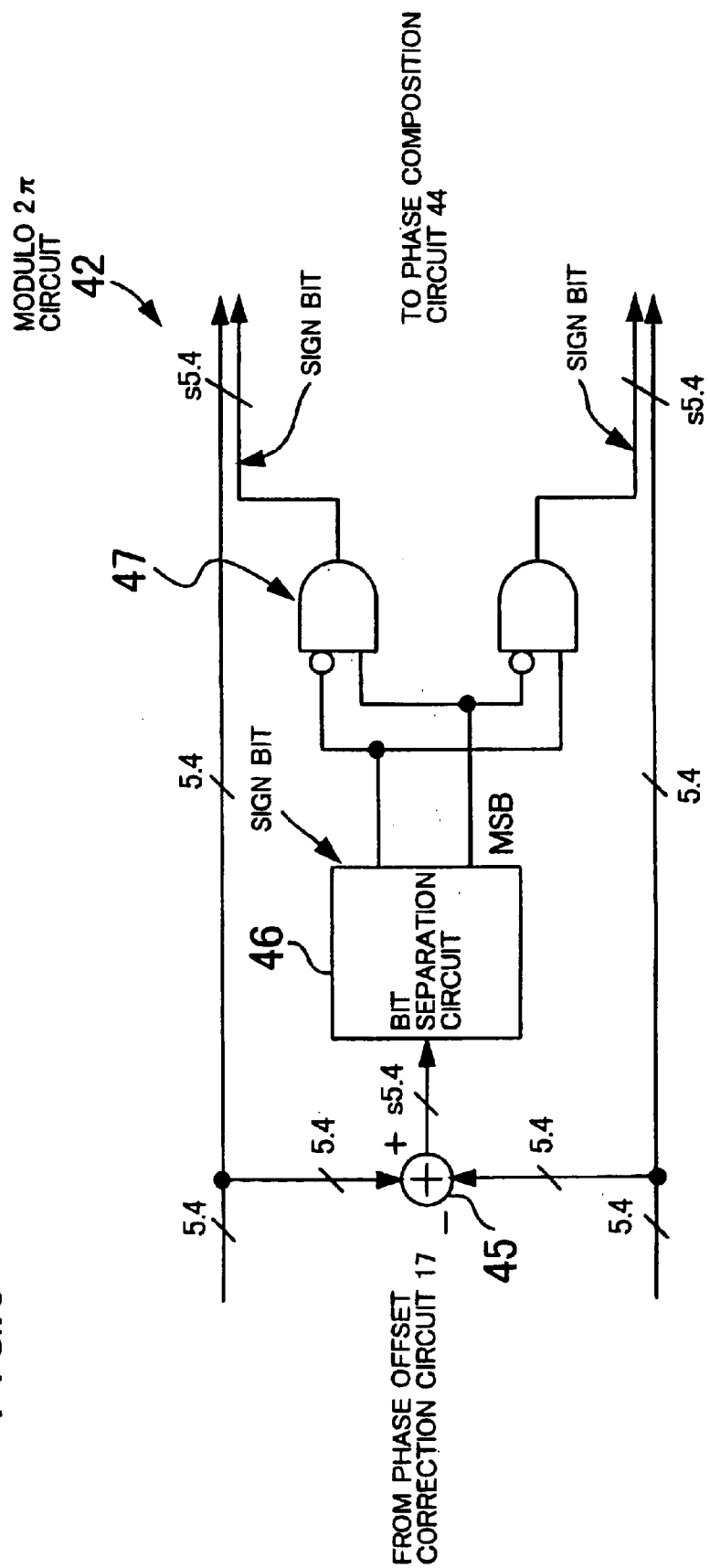
FIG. 6 is a block diagram showing a modulo $2\pi$ circuit of the diversity composition circuit of FIG. 5.

The modulo $2\pi$ circuit 42 has two series of data transfer routes as seen in FIG. 6, and data routes branched from the data transfer routes are connected to an adder 45. A bit separation circuit 46 is connected to the adder 45. The bit separation circuit 46 is connected to the data transfer routes via a logical operation circuit 47.

The adder 45 calculates difference data from phase data of a radio modulation signal received by the pair of different communication antennae 11, and the bit separation circuit 46 separates a sign bit and the MSB from the difference data of the phase data. The logical operation circuit 47 executes predetermined logical operation with the sign bit and the MSB and applies a result of the operation to the pair of phase data.

The modulo $2\pi$ circuit 42 having such a structure as described above converts phase data of a radio modulation signal received by the pair of different communication antennae 11 and individually detected by the two series of phase detection sections 5 into phase data of $2\pi/32$ radians.

Figure 7:
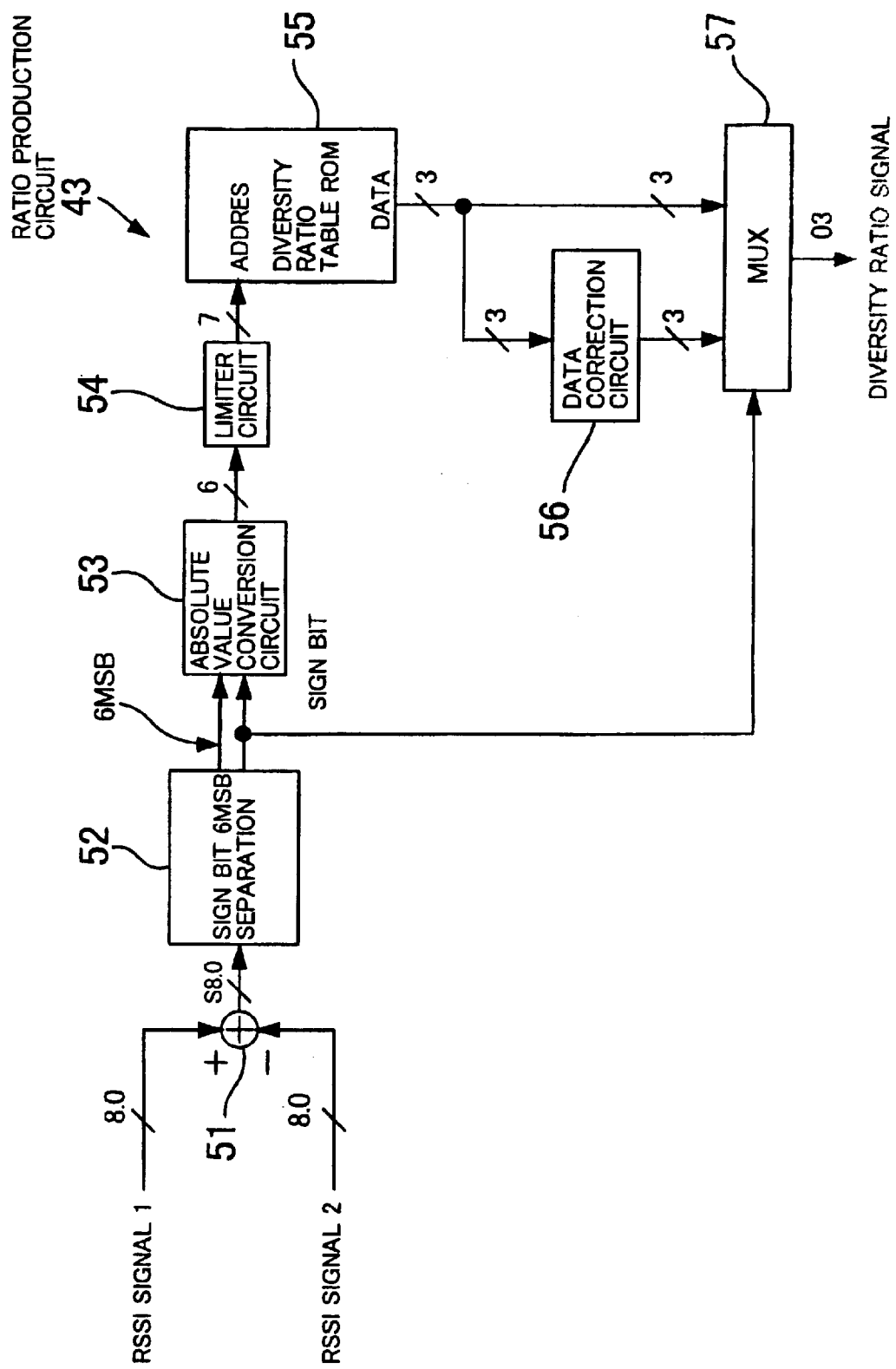
FIG. 7 is a block diagram showing a ratio production circuit of the diversity composition circuit of FIG. 5.

Referring now to FIG. 7, the ratio production circuit 43 is connected at a pair of control input terminals thereof to a single adder 51, which serves as difference calculation means, and a bit separation circuit 52, an absolute value conversion circuit 53, a limiter circuit 54, and a table ROM 55 which serves as rate storage means and rate readout means, are connected in order to the adder 51.

A data output terminal of the table ROM 55 is connected, on one hand, directly to a mixer 57, and on the other hand, indirectly through a data correction circuit 56. A sign bit output terminal of the bit separation circuit 52 is connected to a control input terminal of the multiplexer 57.

The adder 51 calculates difference data from RSSIs (Reserved Signal Strength Indicator) which are electric field strength signals of a radio modulation signal received by the pair of different communication antennae 11, and the bit separation circuit 52 separates the MSB and the sign bit from the difference data of the electric field strength signals.

Figure 8:
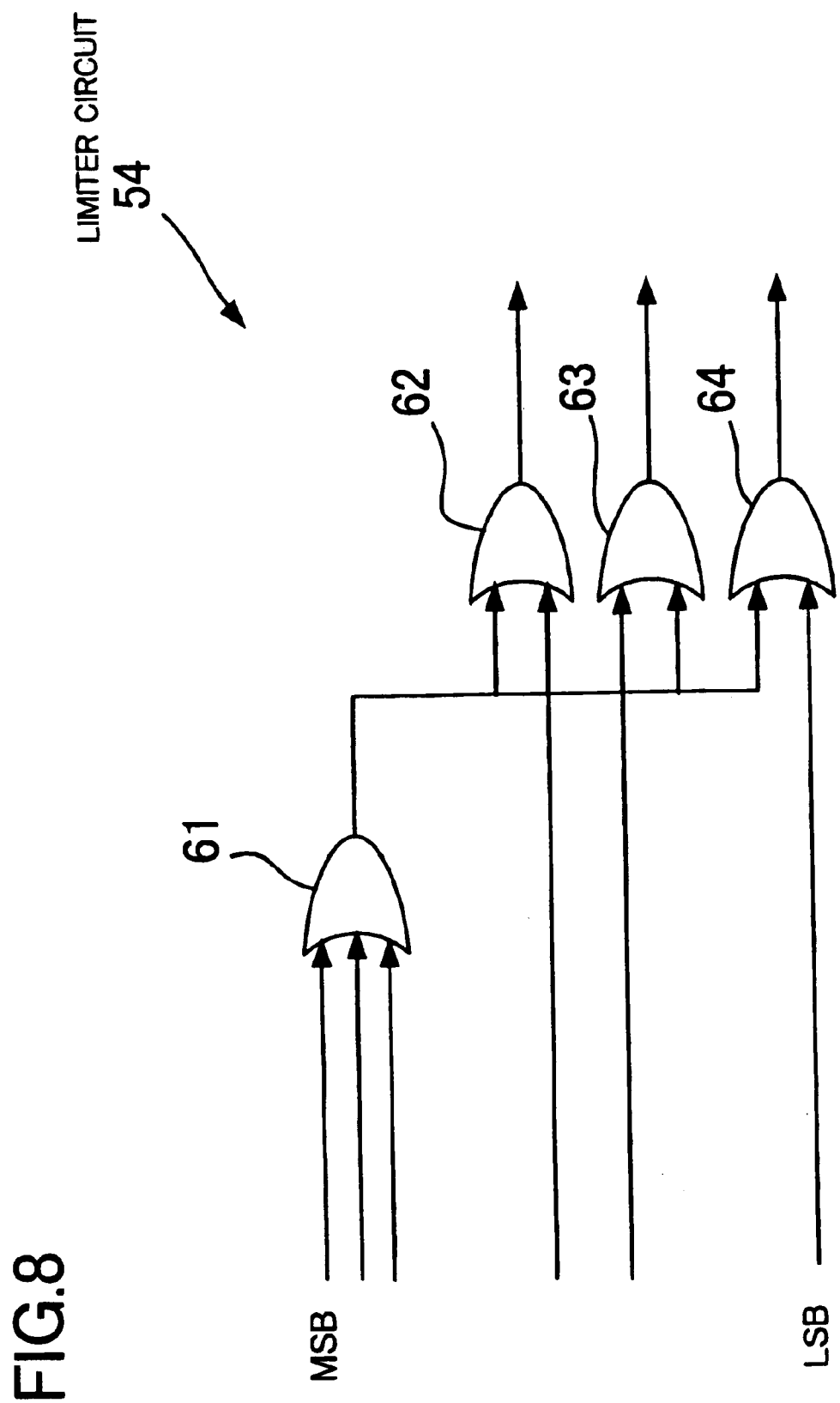
FIG. 8 is a block diagram showing a limiter circuit of the ratio production circuit of FIG. 7.

The absolute value conversion circuit 53 converts, since the difference data of the electric field strength signals inputted separately as the MSB and the sign bit from the bit separation circuit 52 is in the form of a complementary number to 2, the difference data into absolute value data of 6 bits which does not include the positive or negative sign. The limiter circuit 54 includes, as shown in FIG. 8, four OR gates 61 to 64 and compresses, since the I/F amplifier 13 is a LOG amplifier, the difference data of the electric field strength signals having been converted into absolute value data from 6 bits to 3 bits on the LOG level to produce address data.

The table ROM 55 has eight diversity ratios set in advance therein as binary data for different address data of 3 bits as indicated in Table 1 below, and outputs binary data of a diversity ratio as a ratio signal corresponding to address data inputted thereto.

TABLE 1

| Address | Binary Data (div_ratio) |
|---------|-------------------------|
| 0 | 100 |
| 1 | 101 |
| 2 | 101 |
| 3 | 110 |
| 4 | 110 |
| 5 | 110 |
| 6 | 111 |
| 7 | 111 |

The data correction circuit 56 execute predetermined data correction for the ratio signal, and the multiplexer 57 selectively outputs the corrected ratio signal or the ratio signal which has not been corrected in response to the sign bit outputted from the bit separation circuit 52.

In short, where the RSSI signal 1≧RSSI signal 2, a diversity ratio of the table ROM 55 is outputted directly, but where the RSSI signal 1<RSSI signal 2, a diversity ratio of the table ROM 55 is outputted after it is converted into a complementary number to 2 by the data correction circuit 56.

The ratio production circuit 43 having such a structure as described above calculates difference data from digital data of electric field strength signals of a radio modulation signal received by the pair of different communication antennae 11 and selectively outputs one of the eight diversity ratios set in advance therein in response to the difference data.

Figure 9:
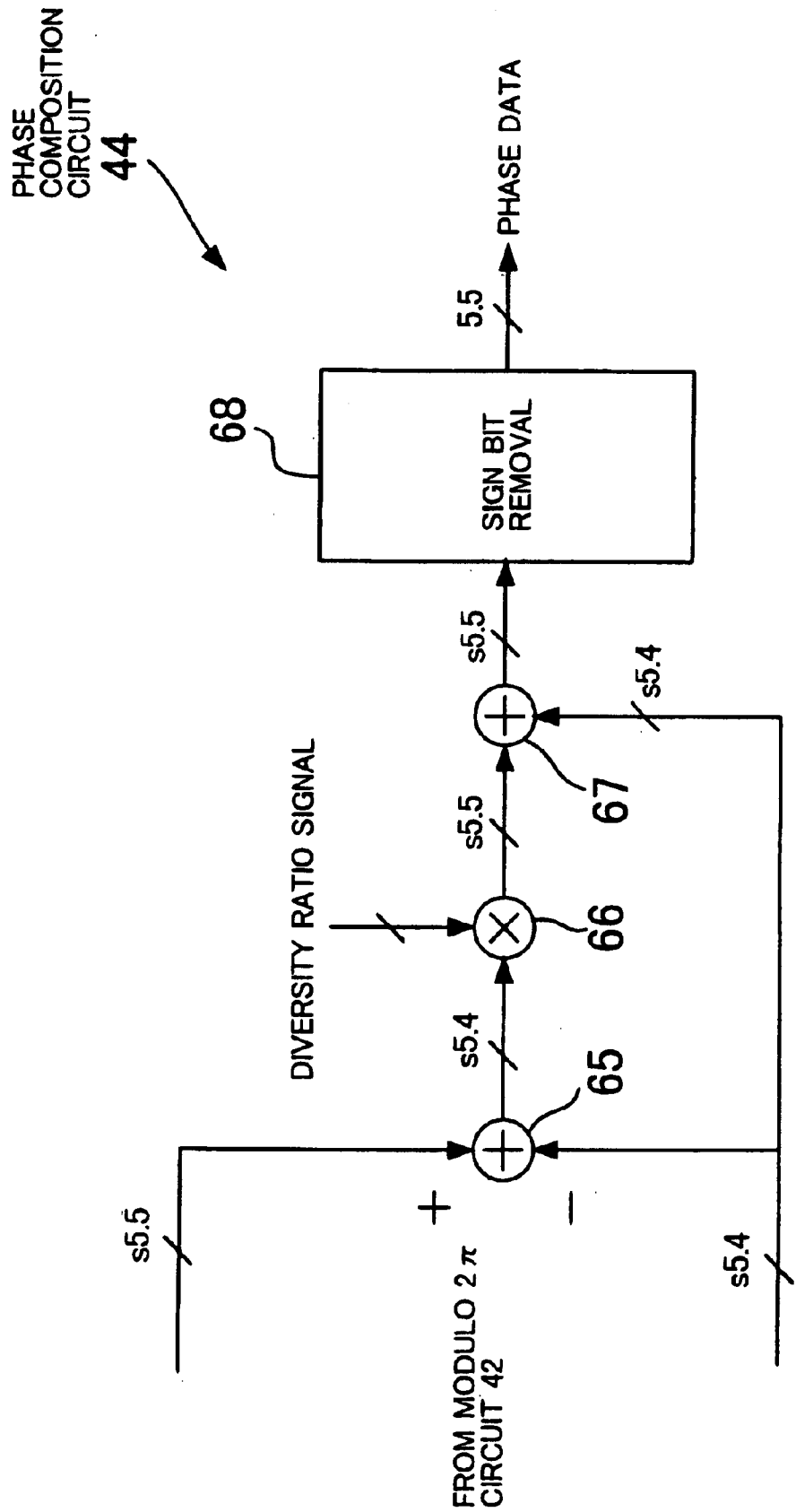
FIG. 9 is a block diagram showing a phase composition circuit the diversity composition circuit of FIG. 5.

Referring to FIG. 9, the phase composition circuit 44 includes an adder 65 to which two data output terminals of the modulo 2π circuit 42 are connected, and a data output terminal of the adder 65 and a data output terminal of the ratio production circuit 43 are connected to a multiplier 66. A data output terminal of the multiplier 66 and one of the two data output terminals of the modulo 2π circuit 42 are connected to an adder 67, and a bit removal circuit 68 is connected to a data output terminal of the adder 67.

The adder 65 subtracts a first one of two phase data of a radio modulation signal received by the pair of different communication antennae 11 from a second one of the two phase data to calculate difference data, and the multiplier 66 multiplies the output data of the adder 65 by a ratio signal corresponding to the electric field strengths of radio reception of the pair of communication antennae 11. The adder 67 adds the first one of two phase data, which has been used to be subtracted by the adder 65, to output data of the multiplier 66, and the bit removal circuit 68 removes the sign bit from the output data of the adder 67.

The phase composition circuit 44 of the diversity composition circuit 41 having such a structure as described above diversity composes two phase data of a radio modulation signal received by the different communication antennae 11 at a ratio corresponding to the electric field strengths of radio reception of the communication antennae 11 as indicated by the following expression:

$$Dp = P1 \times Dr + P2 \times (1-Dr) - (P1-P2) \times Dr + D2$$

Where Dp is the diversity composed phase data, P1 is the output data of the modulo 2π circuit 42 corresponding to a first one of the communication antennae 11, P2 is the output data of the modulo 2π circuit 42 corresponding to a second one of the communication antennae 11, and Dr is the ratio signal.

Figure 10:
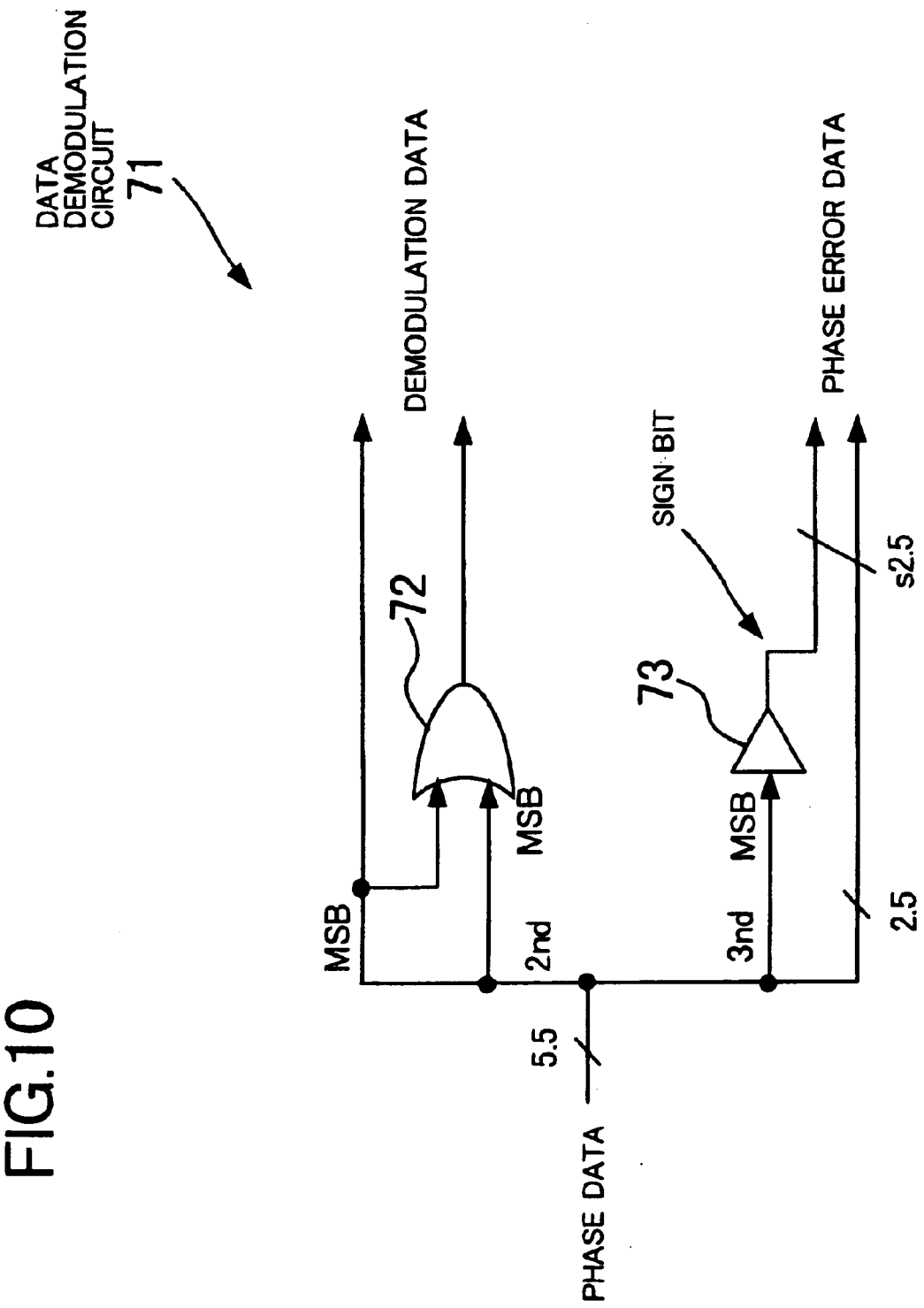
FIG. 10 is a block diagram showing a data demodulation circuit of the radio receiving apparatus of FIG. 1.

Referring back to FIG. 1, to the diversity composition circuit 41 having such a structure as described above, a data demodulation circuit 71 which serves as error detection means is connected. The data demodulation circuit 71 includes logical operation elements such as an OR gate 72, an inverter 73 and so forth as shown in FIG. 10.

The data demodulation circuit 71 executes predetermined logical operation by the OR gate 72, inverter 73 and so forth thereof to produce demodulation data of "0/1" 2 bits by 2 bits from phase data of a modulation signal of π/4 shift QPSK and produce error data which is a result of detection of a phase error.

Error data output terminals of the data demodulation circuit 71 and phase data output terminals of the diversity composition circuit 41 are connected to a selector circuit 74, and an error calculation circuit 75 which serves as phase accumulation means and error accumulation means is connected to a data output terminal of the selector circuit 74.

The radio receiving apparatus 1 of the present embodiment also includes a mode control circuit (not shown), and an output terminal of an operation mode control signal outputted from the mode control circuit is connected to control terminals of the clock production circuit 22, data delaying circuit 39, selector circuit 74 and so forth.

Figure 11:
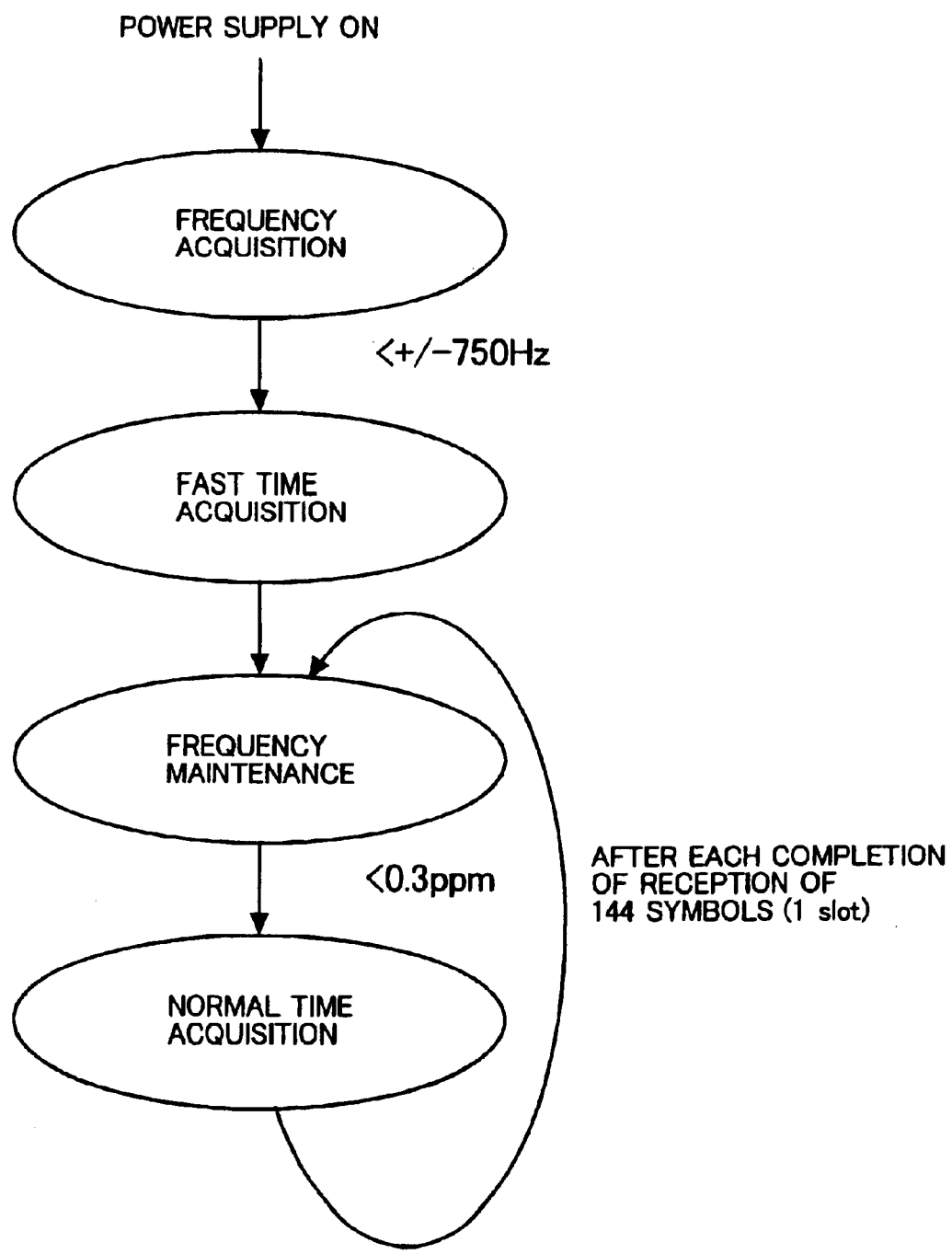
FIG. 11 is a schematic view illustrating a state transition of a radio receiving method performed by the radio receiving apparatus of FIG. 1.

The mode control circuit switchably controls, as hereinafter described in detail, the operation mode of the digital cellular radio receiving apparatus 1 among a frequency rough adjustment mode, a frame synchronization mode, a frequency fine adjustment mode, and a timing control mode as seen in FIG. 11. The register circuit 20 to which a control signal corresponding to one of the operation modes is inputted produces, only when the current operation mode is the frequency rough adjustment mode, a sampling clock with a cycle equal to one fourth that of the symbol clock of a modulation signal, but when the current operation mode is any other mode, produces a sampling clock with a cycle equal to one eighth that of the symbol clock of a modulation signal.

Since also the delay time of the differential detection circuit 15 fluctuates by such switching control of the sampling clock, the data delaying circuit 39 switches the delay time of data transmission in response to the operation mode control signal. Then, the selector circuit 74 selectively outputs phase data outputted from the diversity composition circuit 41 only when the current operation mode is the frequency rough adjustment mode, but when the current operation mode is any other mode, selectively outputs error data outputted from the data demodulation circuit 71.

The error calculation circuit 75 connected to the selector circuit 74 cumulatively adds, in the frequency rough adjustment mode, phase data outputted from the diversity composition circuit 41 for a predetermined period such as, for example, a time of 144 symbols which is one slot of a modulation signal, but in any other mode, cumulatively adds error data outputted from the data demodulation circuit 71 for the predetermined period.

To the error calculation circuit 75, an AFC calculation circuit 76 which serves as reception adjustment means and synchronous demodulation means is connected. The AFC calculation circuit 76 is feedback connected to the TCXO 21 described hereinabove through a D/A converter 77. The AFC calculation circuit 76 performs AFC processing for output data of the error calculation circuit 75 and outputs digital data of a plurality of bits, and the D/A converter 77 converts the digital data into analog data.

Since the output frequency of the TCXO 21 of the VC type varies in response to the analog data, the AFC calculation circuit 76 adjusts, in the frequency rough adjustment mode, the reception frequency so that a result of accumulation of phase data of the error calculation circuit 75 may satisfy a predetermined allowance range, but in the frequency fine adjustment mode, the AFC calculation circuit 76 synchronously demodulates the modulation signal with a phase error cumulatively added by the error calculation circuit 75.

Further, to an error data output terminal of the data demodulation circuit 71, a timing calculation circuit 78 which serves as error accumulation means is connected. The timing calculation circuit 78 cumulatively adds an absolute value of error data for a predetermined period such as, for example, a time of 144 symbols which is one slot of a modulation signal.

The timing calculation circuit 78 and a demodulation data output terminal of the data demodulation circuit 71 are connected to a timing control circuit 79. The timing control circuit 79 includes a correlation value calculation circuit 80 which serves as bit sampling means and frame synchronization means, and a CRC calculation circuit 81. To the timing control circuit 79, a symbol/frame counter 82 which serves as timing control means is connected. The symbol/frame counter 82 is feedback connected to the aforementioned clock production circuit 22.

In the timing control circuit 79, correlation value calculation is executed by the correlation value calculation circuit 80, and CRC calculation is performed by the CRC calculation circuit 81 with demodulation data inputted from the data demodulation circuit 71. More particularly, the correlation value calculation circuit 80 samples out a synchronization word of 20 bits as first bit data from demodulation data of a modulation signal produced in the cycle of the sampling clock, and calculates a frame correlation value from the thus sampled out first bit data and first bit data set in advance.

Meanwhile, the CRC calculation circuit 81 samples out control information of 224 bits as second bit data from demodulation data of a modulation signal produced in the cycle of the sampling clock, and executes CRC calculation with the thus sampled out second bit data and second bit data set in advance.

The symbol/frame counter 82 controls the production timing of the sampling clock of the clock production circuit 22 in response to the frame correlation value and a result of the CRC calculation calculated in such a manner as described above, and consequently, frame synchronization of radio reception of a modulation signal is established.

Meanwhile, the timing control circuit 79 controls the production timing of the second sampling clock of the clock production circuit 22 by the symbol/frame counter 82 in response to error data cumulatively added by the timing calculation circuit 78, and sets the detection timing of error data of the data demodulation circuit 71 to a timing at which the result of the accumulation of an absolute value of the error data exhibits a minimum value.

In such a construction as described above, the radio receiving apparatus 1 of the present embodiment receives a radio modulation signal of the π/4 shift QPSK system transmitted from a base station (not shown) as part of a digital cellular system, and demodulates the modulation signal into a digital signal and then reproduces it into an audio signal.

The radio receiving apparatus 1 of the present embodiment is switchably controlled so that, as seen from FIG. 11, immediately after operation of it is started, the current operation mode may be the frequency rough adjustment mode, in which the reception frequency of a modulation signal is adjusted roughly. After the rough adjustment of the reception frequency is completed, the current operation mode is switchably controlled to the frame synchronization mode, in which frame synchronization of the modulation signal is established.

After the establishment of the frame synchronization is completed, the current operation mode is switchably controlled to the frequency fine adjustment mode, in which the reference frequency of the modulation signal is adjusted finely. If the fine adjustment of the reference frequency is completed, then the current operation mode is switchably controlled to the timing control mode. Thereafter, the current operation mode is switched back to the frequency fine adjustment mode after each predetermined time.

Processing operation of the radio receiving apparatus 1 in the various operations modes described above is successively described. First, in the radio receiving apparatus 1 of the present embodiment, the cycle of a reference clock generated in the predetermined cycle by the TCXO 21 is converted into a cycle of a fraction by the clock production circuit 22 to produce a sampling clock whose period is equal to a fraction of that of the symbol clock of the modulation signal.

Figure 12:
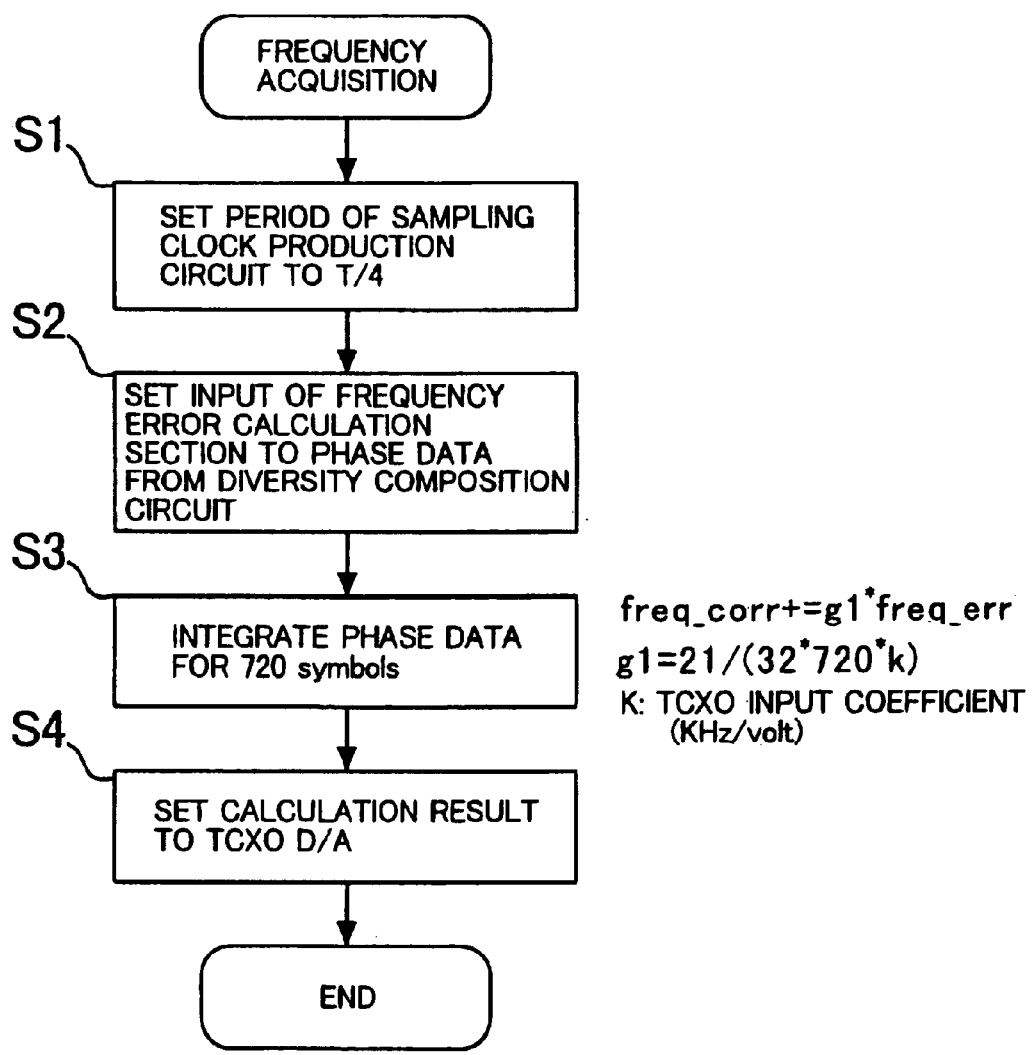
FIG. 12 is a flow chart illustrating rough adjustment operation of a reception frequency (frequency acquisition) of the radio receiving method illustrated in FIG. 11.

While the frequency rough adjustment mode is set immediately after operation of the apparatus is started, as seen in FIG. 12, the mode control circuit switchably controls the clock production circuit 22 so that a sampling clock of a cycle which is equal to one fourth that of the symbol clock of the modulation signal is produced (step S1).

Since a modulation signal of the PSK system is random received in such a condition as described above by each of the radio reception sections 4, phase (variation amount) data of the thus received radio reception signal is sampled out in the cycle of the sampling clock by the corresponding phase digitizer 14, and the phase (difference) data is differentially detected in the cycle of the sampling clock by the differential detection circuit 15 from the phase (variation amount) data of the modulation signal sampled out in this manner.

From the differentially detected phase (difference) data of the modulation signal, the sign bit and the MSB are removed by the phase normalizer 16 while only an effective part is extracted, and the phase data is corrected in regard to an offset with a correction parameter by the offset correction circuit 17.

The thus corrected phase data from the two phase detection sections 5 are diversity composed by the diversity composition circuit 41 and transmitted to the error calculation circuit 75 by the selector circuit 74 which is switchably controlled by the mode control circuit (step S2).

The error calculation circuit 75 cumulatively adds the phase data for a predetermined period (step S3), and the AFC calculation circuit 76 executes AFC calculation with the cumulatively added phase data. A calculation result of the AFC calculation is converted from digital data into an analog voltage by the D/A converter 77 (step S4). Then, the oscillation frequency of the TCXO 21 varies in response to the analog voltage from the D/A converter 77.

Consequently, the sampling clock of the clock production circuit 22 is feedback controlled, and accordingly, the reception frequency of the modulation signal is roughly adjusted so that the reception frequency of the modulation signal may satisfy the predetermined allowance range. In the radio receiving apparatus 1 of the present embodiment, when the reception frequency of the modulation signal is roughly adjusted in such a manner as described above, the reception frequency is adjusted with a result of accumulation of phase data making use of the fact that the modulation signal is random received. Consequently, since a phase error need not be detected from the modulation signal in order to adjust the reception frequency, rough adjustment of the reception frequency can be executed by simple processing.

Besides, when the reception frequency of the modulation signal is roughly adjusted in such a manner as described above, since phase data to be utilized for rough adjustment is sampled out in a cycle equal to one fourth that of the symbol clock of the modulation signal, rough adjustment of the reception frequency can be completed at a high speed. Since adjustment of the reception frequency can be completed at a high speed in this manner, in order to realize this, a device having a frequency which is stabilized with a high degree of accuracy need not be used for the TCXO 21, and the productivity of the radio receiving apparatus 1 can be improved.

Figure 13:
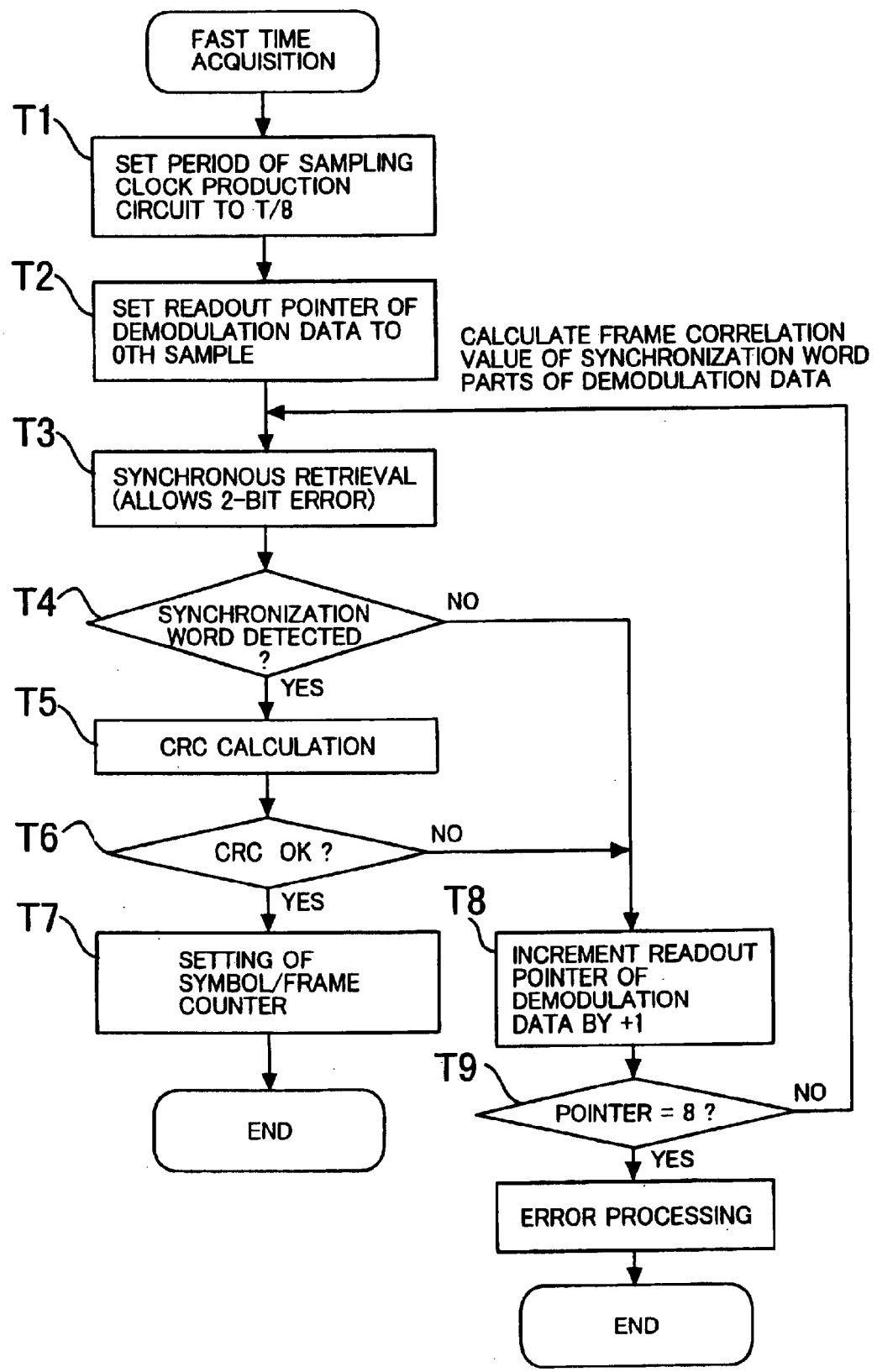
FIG. 13 is a flow chart illustrating frame synchronization establishment operation (first time acquisition) of the radio receiving method illustrated in FIG. 11.

After such rough adjustment of the reception frequency is completed, the current operation mode of the radio receiving apparatus 1 is switched from the frequency rough adjustment mode to the frame synchronization mode. Where the frame synchronization mode is set, the cycle of the sampling clock to be produced by the clock production circuit 22 is switchably controlled, as seen in FIG. 13, to one eighth that of the symbol clock of the modulation signal (step T1).

Since a radio modulation signal is received in such a condition as described above by the radio reception section 4, phase data is detected in the cycle of the sampling clock from the thus received radio modulation signal by the phase detection section 5, and demodulation data is produced from the phase data detected in the cycle of the sampling flock in this manner by the data demodulation circuit 71.

From the demodulation data of the modulation signal, first bit data is sampled out by the correlation value calculation circuit 80 of the timing control circuit 79, and a frame correlation value is calculated from the thus sampled out first bit data and the first bit data set in advance (steps T2 to T4).

Then, from the demodulation data of the modulation signal, second bit data is sampled out by the CRC calculation circuit 81 of the timing control circuit 79, and CRC calculation is executed with the thus sampled out second bit data and the second bit data set in advance (steps T5 and T6).

Then, since the production timing of the sampling clock of the clock production circuit 22 is controlled in response to the frame correlation value calculated in such a manner as described above and the CRC calculation result by the symbol/frame counter 82, frame synchronization of radio reception of the modulation signal is established (step T7).

In the radio receiving apparatus 1 of the present embodiment, when frame synchronization is to be established in such a manner as described above, since phase data of the modulation signal to be used for the calculation is sampled out in the cycle equal to one eighth that of the symbol clock, the establishment of frame synchronization can be completed at a high speed.

Figure 14:
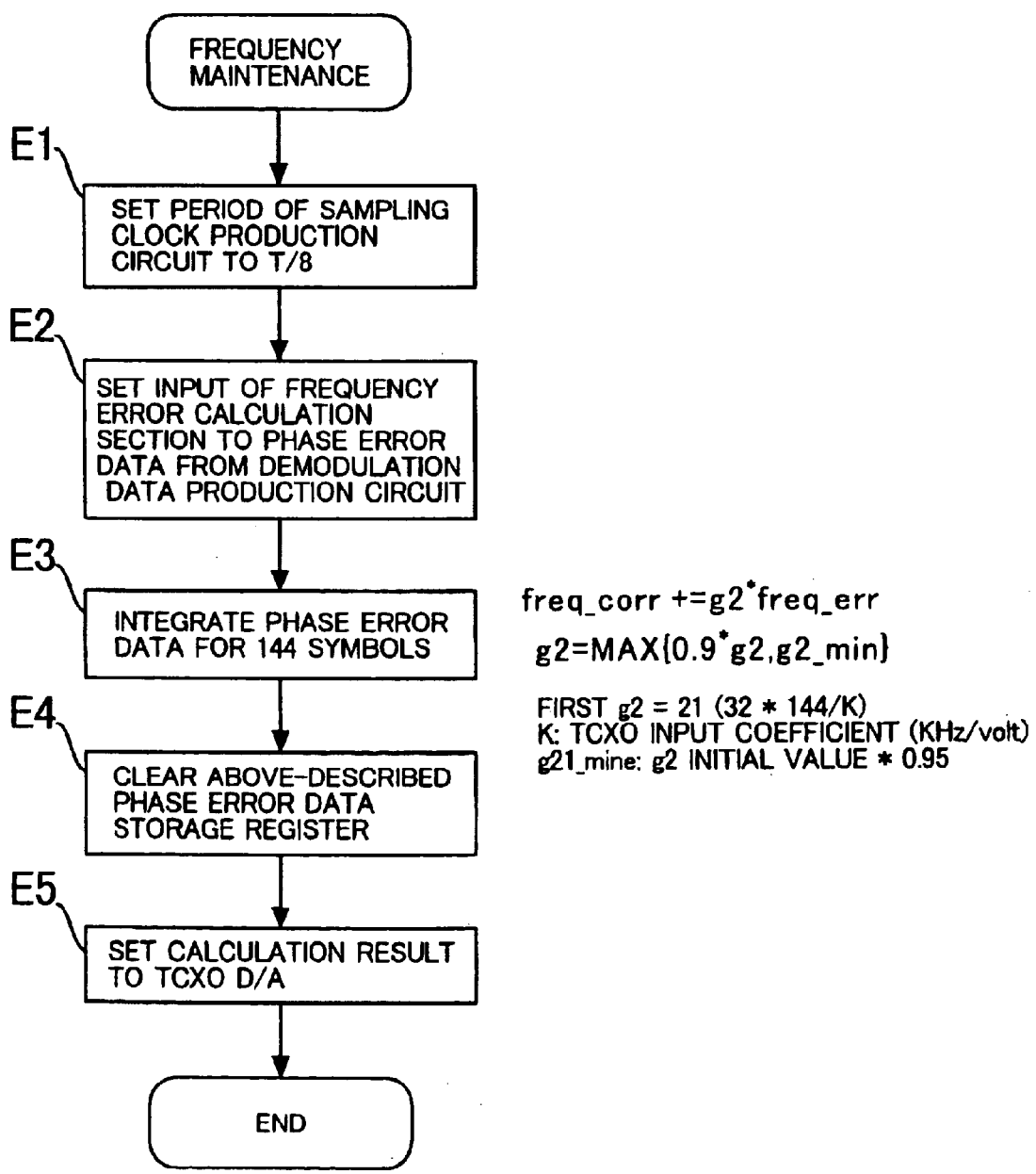
FIG. 14 is a flow chart illustrating fine adjustment operation of a reception frequency (frequency maintenance) of the radio receiving method illustrated in FIG. 11.

After such establishment of frame synchronization as described above is completed, the current operation mode of the radio receiving apparatus 1 is switchably controlled from the frame synchronization mode to the frequency fine adjustment mode. Also in the frequency fine adjustment mode, the cycle of the sampling clock to be produced by the clock production circuit 22 is switchably controlled, as seen in FIG. 14, to one eighth that of the symbol clock of the modulation signal (step E1).

Since a radio modulation signal is received in such a condition as described above by the radio reception section 4, phase data is detected in the cycle of the sampling clock from the received radio modulation signal by the phase detection section 5, and a phase error of the phase data detected in the cycle of the sampling clock in this manner is produced as error data by the data demodulation circuit 71.

The error data is transmitted to the error calculation circuit 75 by the selector circuit 74 which switchably controlled by the mode control circuit (step E2) and is cumulatively added for a predetermined period by the error calculation circuit 75 (step E3). The AFC calculation circuit 76 executes AFC calculation with the cumulatively added phase data, and a calculation result of the AFC calculation is converted into an analog voltage by the D/A converter 77.

Since the oscillation frequency of the TCXO 21 varies in response to the analog voltage (step E5), the sampling clock is feedback controlled thereby, and the reception frequency of the modulation signal is finely adjusted so that it may satisfy the predetermined allowance range and the modulation signal is synchronously demodulated.

In the radio receiving apparatus 1 of the present embodiment, when a modulation signal is to be synchronously demodulated in such a manner as described above, since the phase data which is utilized for calculation of the phase error is sampled out in the cycle equal to one eighth that of the symbol clock, synchronous demodulation of the modulation signal can be completed at a high speed.

After such synchronous demodulation of the modulation signal is completed, the current operation mode of the radio receiving apparatus 1 is switched from the frequency fine adjustment mode to the timing control mode after each predetermined time. Consequently, the timing control mode and the frequency fine adjustment mode are repeated for each predetermined time.

Figure 15:
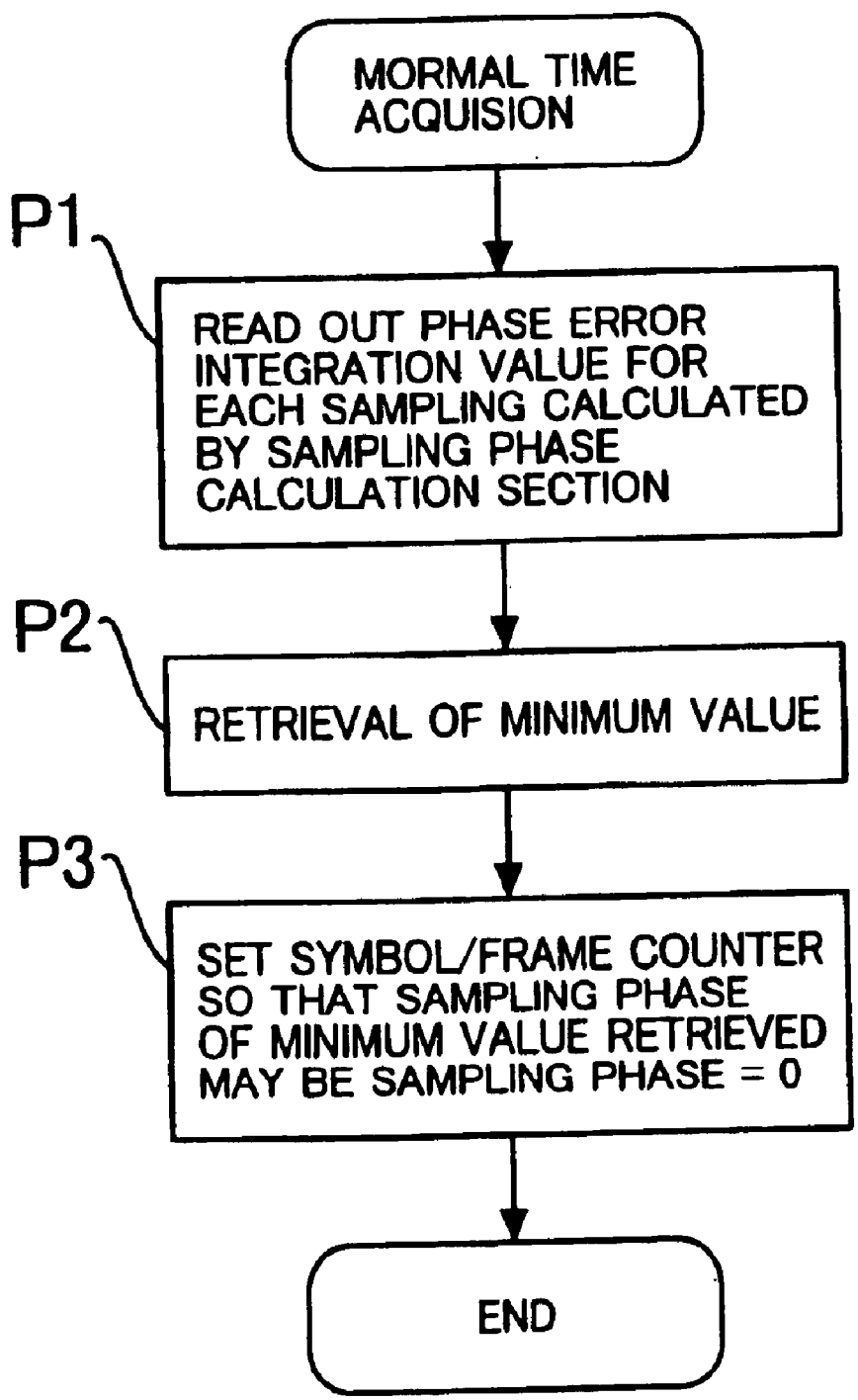
FIG. 15 is a flow chart illustrating setting operation of a sampling timing (normal time acquisition) of the radio receiving method illustrated in FIG. 11.

Also in the timing control mode, as seen in FIG. 15, the error data produced in the cycle of the symbol clock by the data demodulation circuit 71 is cumulatively added for the predetermined period by the timing calculation circuit 78 (step P1), and a detection timing of the error data at which the cumulatively added error data exhibits its minimum value is set to the clock production circuit 22 from the symbol/frame counter 82 by the timing control circuit 79.

In the frequency fine adjustment mode after the setting of the error data detection timing in the timing control mode, since the data demodulation circuit 71 detects error data at a timing at which the accumulation result of the error data exhibits its minimum value, synchronous demodulation of the demodulation signal is executed with the error data detected at this timing.

In the radio receiving apparatus 1 of the present embodiment, since the detection timing of error data which is a phase error of a modulation signal is adjusted to a timing at which the accumulation result of the error data becomes minimum as described above, it is prevented that the error data is detected at a timing at which the error data exhibits an increase originating from an influence of a phase variation or the like. In short, since error data can be detected at an optimum timing from the modulation signal, the reception performance of the modulation signal can be improved.

It is to be noted that, in the radio receiving apparatus 1 of the present embodiment, radio reception of a modulation signal is executed in accordance with the diversity system irrespective of such various operation modes as described above. In this instance, a radio modulation signal is received by the pair of communication antennae 11, and after the electric field strengths of radio reception of the communication antennae 11 are individually converted from analog into digital signals by the pair of A/D converters 38, they are inputted to the single diversity composition circuit 41.

In the diversity composition circuit 41, difference data of the pair of digital data is calculated by the adder 51 of the ratio production circuit 43, and a diversity ratio is read out from the table ROM 55 using the difference data as address data, and the pair of phase data of the modulation signal are diversity composed in accordance with the diversity ratio.

In the radio receiving apparatus 1 of the present embodiment, as the plurality of diversity ratios set in advance in the table ROM 55 are selectively read out in response the electric field strengths of a radio signal received by the pair of communication antennae 11 as described above, the radio signal received by the communication antennae 11 can be diversity composed at an appropriate ratio in response to a difference in electric field strength.

In short, since the communication antennae 11 to be utilized for radio communication are not switchably controlled simply in response the electric field strengths, the reception performance of the modulation signal is be improved. By verification conducted by simulation of the reception performance by diversity composition of the radio receiving apparatus 1 of the present embodiment, it was confirmed that the reception performance was improved by approximately 3 dB with respect to that by the antenna switching system of the prior art.

Further, in the radio receiving apparatus 1 of the present embodiment, since the sampling clock is set, only when the current operation mode is the frequency rough adjustment mode, to a cycle equal to one fourth that of the symbol clock of a modulation signal but is set to another cycle equal to one eighth when the current operation mode is any other operation mode, a modulation signal of the π/4 shift QPSK system can be sampled out at an optimum timing in the various operations.

By verification conducted by simulation of a variation of the reception performance by switching control of the sampling clock of the radio receiving apparatus 1 of the present embodiment with random data of three kinds of data lengths, it was confirmed that, as the cycle of the sampling clock, one eighth that of the symbol clock is optimum.

TABLE 2

| | BER (%) for different random seeds | | | |
|---|---|---|---|---|
| Samples_T | 7477 | 21765 | 31126 | Ave BER (%) |
| 4 | 3.51 | 3.90 | 3.37 | 3.59 |
| 8 | 2.98 | 3.56 | 2.87 | 3.14 |
| 16 | 3.03 | 3.48 | 2.97 | 3.35 |

It is to be noted that, in the frequency rough adjustment mode, the cycle of the sampling clock is set to one fourth that of the symbol clock of a modulation signal, and although it has been proved by the Nyquist theory that derivation of a frequency is possible with one half that, one fourth is determined to be optimum because one half provides a large derivation error in environment wherein the characteristic of radio propagation is in a deteriorated condition.

Further, in the radio receiving apparatus 1 of the present embodiment, since the sign bit and the MSB are removed from phase data of a modulation signal and an effective part is extracted by the phase normalizer 16 irrespective of such various operation modes as described above, phase data is adjusted to that in an optimum dynamic range and the reception performance is high.

Further, since phase data of a modulation signal is corrected with a correction parameter which corresponds to frequency differences among the symbol clock of the modulation signal, an I/F signal, a reference clock and a sampling clock by the offset correction circuit 17, an offset which arises with the phase data of the modulation signal from the frequency differences of the clock signals is corrected and the reference performance is high.

In other words, since, even if frequency differences are present among the various clock signals, they do not matter if the correction parameter of the offset correction circuit 17 is set appropriately, various devices can be adopted suitably for the I/F amplifier 13 or the TCXO 21, and the productivity of the radio receiving apparatus 1 can be improved.

Besides, with the radio receiving apparatus 1 of the present embodiment, while the cycle of the sampling clock is switchably controlled between two stages depending upon the operation modes as described above, since also the correction parameter of the offset correction circuit 17 is switched between two values in response to the switching control, even if the sampling clock is switched, the offset of the phase data of the modulation signal can be corrected appropriately.

Here, the demodulation performance of the radio receiving apparatus 1 of the present embodiment is verified particularly. First, according to the standards RCR-STD27F for a digital automobile telephone system published by the Aggregate Corporation of the Radio Wave Industrial Society of Japan, a desired signal to interference signal power ratio which indicates a demodulation performance of a PDC is prescribed with the interference level CIR (Carrier to Interference Ratio) as in Table 3 below.

TABLE 3

| BER | 1% | 3% |
|---|---|---|
| Static | 13 dB or less | 11 dB or less |
| Fading present (no diversity) | 22 dB or less | 17 dB or less |
| Fading present (diversity present after detection) | 16 dB or less | 13 dB or less |

It is to be noted that the interference level CIR is a ratio between a desired signal level and a disturbing signal level with which the BER (Bit Error Rate) of the TCH (Traffic Channel) exhibits $1\times10^{-2}$ or $1\times10^{-3}$ when the input level of the desired signal is +30 dB of the rated sensitivity under Rayleigh fading of a maximum Doppler frequency $f_D$=40 Hz and a disturbing signal modulated with a digital signal (two-value false noise sequence of 767 bits whose code length is 32) is applied.

Thus, by verification of the demodulation performance of the radio receiving apparatus 1 of the present embodiment conducted by simulation under such conditions as described above, such performances as given in Table 4 below were confirmed.

TABLE 4

| | 8 dB | 10 dB | 13 dB | 16 dB |
|---|---|---|---|---|
| Static | 2.73 | 0.76 | 0.0082 | 0.0009 |
| 8 Km/h | 4.74 | 2.99 | 0.99 | 0.31 |
| 50 Km/h | 5.23 | 3.10 | 1.16 | 0.39 |
| 100 Km/h | 6.00 | 3.04 | 1.26 | 0.42 |

It is to be noted that, in Table 4 above, the BER at which the particular CIR was exhibited for each predetermined speed of movement was simulated. Since the maximum Doppler frequency $f_D$ corresponds to the speed of movement of 50 Km/h, it was confirmed that the radio receiving apparatus 1 of the present embodiment sufficiently satisfied the prescribed value of the Recommendation as indicated in Table 5 below.

TABLE 5

| BER | 1% | 3% |
| --- | --- | --- |
| Static | 13 dB or less → BER = 0.082% or less | 11 dB or less → BER ≈ 0.76% |
| Fading present (diversity present after detection) | 16 dB or less → BER = 0.39% or less | 13 dB or less → BER = 1.16% or less |

It is to be noted that the present invention is not limited to the embodiment described above and allows various modifications without departing from the spirit thereof. For example, while, in the embodiment described above, it is described as an example that the various elements of the error detection apparatus 21 are individually formed as hardware components for exclusive use, it is possible, for example, to realize the various elements of the radio receiving apparatus 1 by installing suitable software into a computer so as to operate on it, and also it is possible to realize some of them by software while some of them are formed as hardware.

Figure 16:
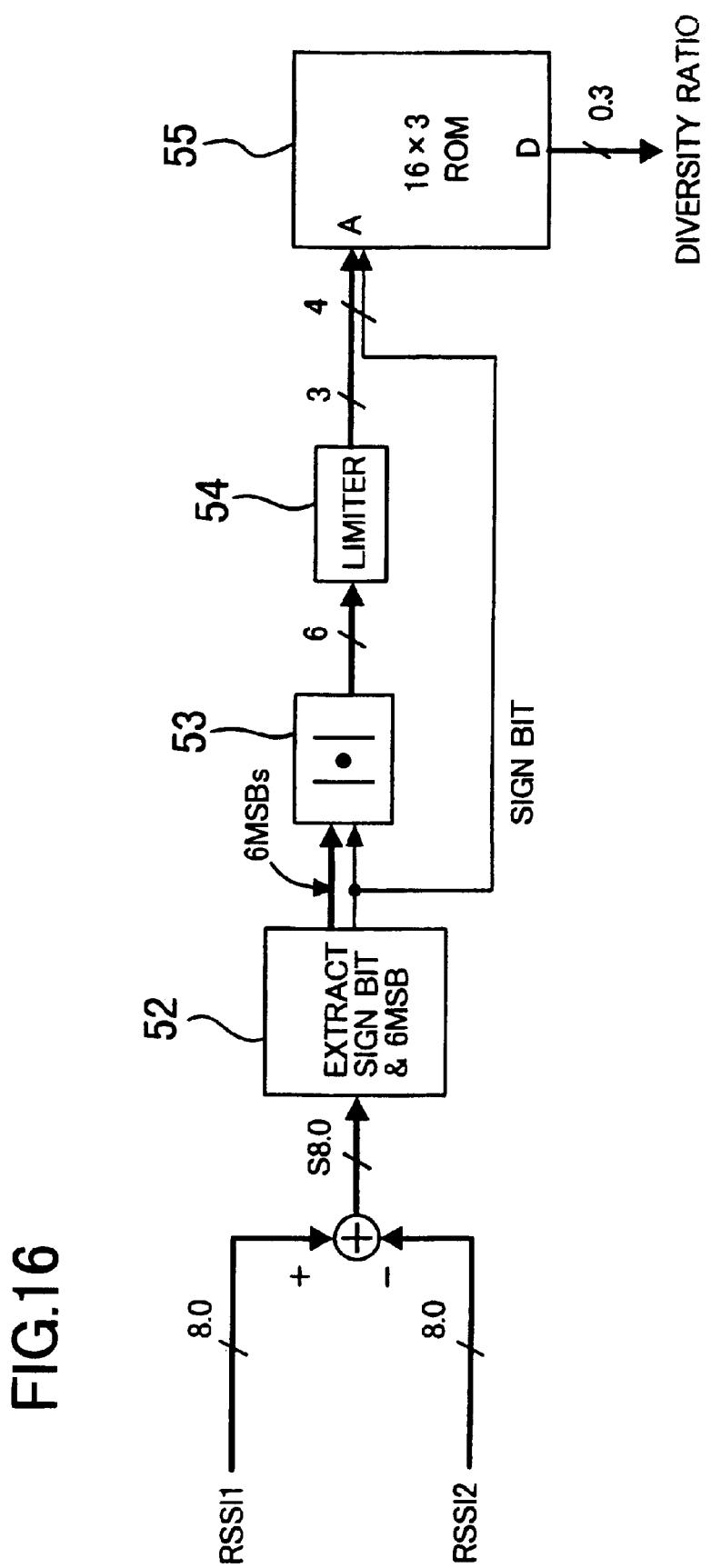
FIG. 16 is a block diagram showing a modified form of the ratio production circuit.
Figure 17:
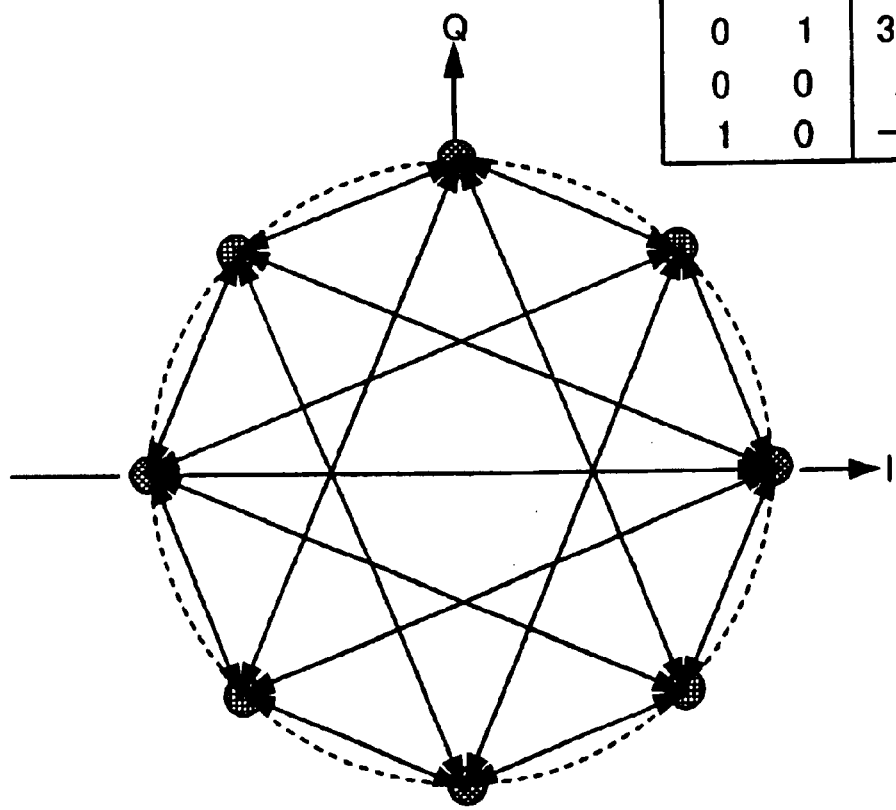
FIG. 17 is a diagrammatic view illustrating a principle of operation of $\pi/4$ shift QPSK.
Figure 18:
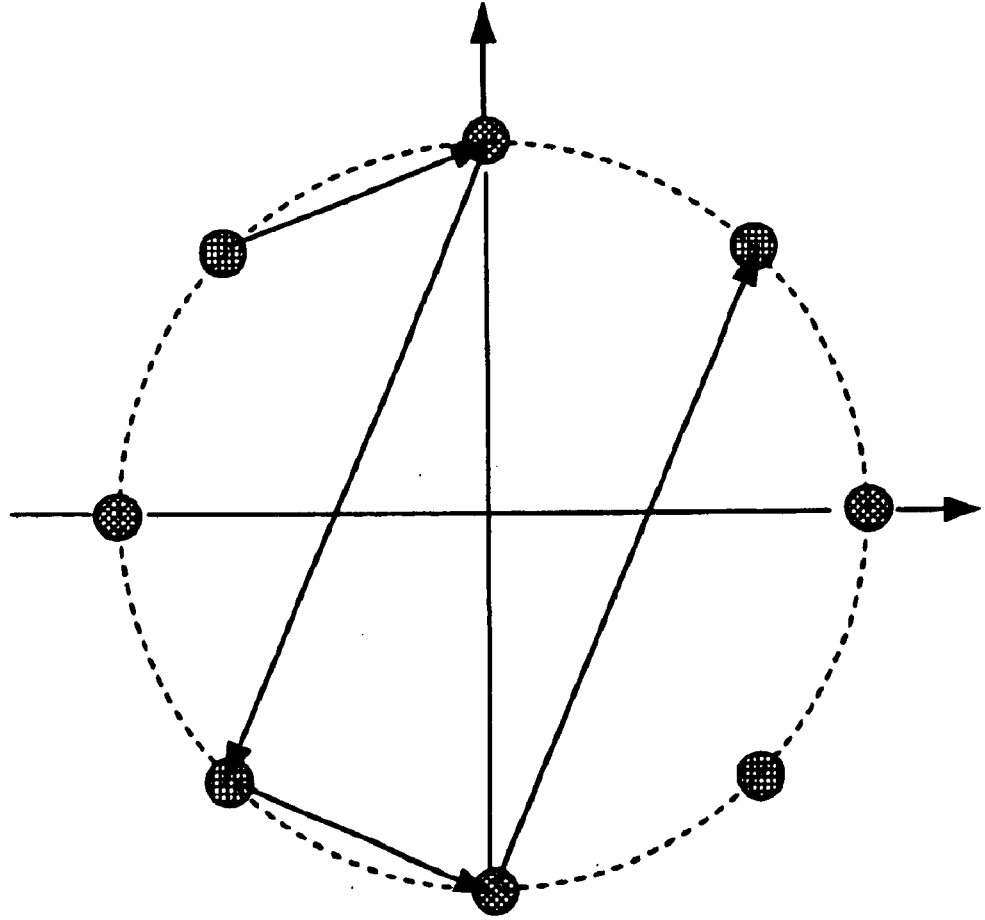
FIG. 18 is a diagrammatic view illustrating an example of data modulation of $\pi/4$ shift QPSK.

Further, while, in the embodiment described above, it is described as an example that, in order to reduce the storage capacity of the table ROM 55, a diversity ratio of the table ROM 55 is selected directly in response to the magnitude relating between the RSSI signals 1 and 2 as shown in FIG. 7 or selection is performed after conversion into a complementary number by the data correction circuit 56, the ratio production circuit 43 may be formed in such a construction as shown in FIG. 16.

While a preferred embodiment of the present invention has been described using specific terms, such description is for illustrative purposes only, and it is to be understood that changes and variations may be made without departing from the spirit or scope of the following claims.

What is claimed is:

1. A radio receiving method wherein a radio modulation signal of a PSK system transmitted by radio with a predetermined frequency is received and the reception frequency of the modulation signal is adjusted to a transmission frequency, comprising the steps of:

producing a sampling clock of a cycle equal to 1/n of a symbol clock of a received radio modulation signal, n being an integer;

detecting a pair of phase data included in a pair of radio modulation signals received by a pair of communication antennae individually in the cycle of the sampling clock;

diversity composing the pair of detected phase data at a ratio in response to electric field strengths of radio reception of said communication antennae;

cumulatively adding the composed data for a predetermined period; and adjusting the reception frequency so that a calculation result of the cumulative addition may satisfy a predetermined allowance range.

2. A radio receiving method as claimed in claim 1, wherein the sampling clock is produced so as to have a cycle equal to a fraction of that of a symbol clock of the modulation signal, and the phase data is sampled out from the modulation signal in the cycle of the sampling clock.

3. A radio receiving method as claimed in claim 2, wherein the modulation system of the modulation signal is a π/4 shift QPSK system, and the sampling clock is produced so as to have a cycle equal to one fourth that of the symbol clock of the modulation signal.

4. A radio receiving apparatus which receives a radio modulation signal of a PSK system transmitted with a predetermined frequency and adjusted a reception frequency of the modulation signal corresponding to a transmission frequency, comprising:

clock production means for producing a sampling clock of a cycle equal to 1/n of a symbol clock of a received radio modulation signal, n being an integer;

data detection means for detecting a pair of phase data included in a pair of radio modulation signals received by a pair of communication antennae individually in the cycle of the sampling clock;

composing means for diversity composing the pair of detected phase data at a ratio in response to electric field strengths of radio reception of said communication antennae;

phase accumulation means for cumulatively adding the composed data for a predetermined period; and reception adjustment means for adjusting a reception frequency so that a calculation result of the cumulative addition may satisfy a predetermined allowance range.

5. A radio receiving apparatus as claimed in claim 4, wherein said clock production means produces a sampling clock of a cycle equal to a fraction of that of a symbol clock of the modulation signal, and said phase sampling means samples out the phase data from the modulation signal in the cycle of the sampling clock produced by said clock production means.

6. A radio receiving apparatus as claimed in claim 5, wherein said clock production means produces a sampling clock of a cycle equal to a fraction of that of the symbol clock at a ratio corresponding to the modulation system of the modulation signal.

7. A radio receiving apparatus as claimed in claim 6, wherein the modulation system of the modulation signal is a π/4 shift QPSK system, and said clock production means produces a sampling clock of a cycle equal to one fourth that of the symbol clock of the modulation signal.

* * * * *